(12) United States Patent
Sakai et al.

(10) Patent No.: US 7,656,398 B2
(45) Date of Patent: Feb. 2, 2010

(54) SURFACE LIGHT SOURCE DEVICE AND LIQUID CRYSTAL DISPLAY DEVICE

(75) Inventors: Seiji Sakai, Tokyo (JP); Takuya Sakamoto, Kumamoto (JP); Toshiyuki Yoneda, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 674 days.

(21) Appl. No.: 11/190,949

(22) Filed: Jul. 28, 2005

(65) Prior Publication Data

US 2006/0022935 A1   Feb. 2, 2006

(30) Foreign Application Priority Data

Jul. 28, 2004   (JP)   .............................. 2004-220791

(51) Int. Cl.
*G09G 5/00*   (2006.01)
(52) U.S. Cl. ........................... 345/204; 345/98; 345/99; 345/100; 345/102
(58) Field of Classification Search ................. 345/204, 345/98–102
See application file for complete search history.

(56) References Cited

U.S. PATENT DOCUMENTS

| | | | |
|---|---|---|---|
| 5,138,783 | A | 8/1992 | Forsse |
| 6,069,676 | A | 5/2000 | Yuyama |
| 6,199,994 | B1 | 3/2001 | Watai |
| 6,366,270 | B1 | 4/2002 | Evanicky |
| 7,002,547 | B2 * | 2/2006 | Yamada ....................... 345/102 |
| 7,256,763 | B2 * | 8/2007 | Kaneki et al. ................ 345/102 |

FOREIGN PATENT DOCUMENTS

| | | |
|---|---|---|
| CN | 1461966 | 12/2003 |
| JP | 8-240721 | 9/1996 |
| JP | 2000-36207 | 2/2000 |
| JP | 2001-210122 | 8/2001 |
| JP | 2002-134284 | 5/2002 |
| JP | 2003-057622 | 2/2003 |

(Continued)

OTHER PUBLICATIONS

Taiwanese Office Action in corresponding Application No. 094120159 dated Dec. 17, 2008 (5 pages) and English-language translation (3 pages).

(Continued)

*Primary Examiner*—Richard Hjerpe
*Assistant Examiner*—Leonid Shapiro
(74) *Attorney, Agent, or Firm*—Buchanan Ingersoll & Rooney PC

(57) ABSTRACT

A surface light source device includes light source driving means for driving light sources on a light emission block basis, a light exit area being sectioned into two or more light emission blocks, light quantity detecting means for detecting light quantities on the basis of output light beams that are led out from the two or more light emission blocks, and drive control means for adjusting emission light quantities of the light sources corresponding to the respective light emission blocks on the basis of light quantities that are detected during lighting periods when only one of the light emission blocks is lit up that are subjected to light quantity detection by the light quantity detecting means.

15 Claims, 37 Drawing Sheets

FOREIGN PATENT DOCUMENTS

| | | |
|---|---|---|
| JP | 2003-532273 | 10/2003 |
| TW | 514709 | 12/2002 |
| TW | 589470 | 6/2004 |
| WO | WO 0005706 | 2/2000 |
| WO | 01/84046 | 11/2001 |

OTHER PUBLICATIONS

Notification of Reason for Refusal dated Aug. 11, 2009 issued in Japanese Application No. 2004-220791 (with English Translation).

* cited by examiner

SURFACE LIGHT SOURCE DEVICE AND LIQUID CRYSTAL DISPLAY DEVICE

BACKGROUND OF THE INVENTION

1. Field of the Invention

The present invention relates to a surface light source device and a liquid crystal display device and, more specifically, to improvement of a surface light source device as a backlight for illuminating, from the back side, a liquid crystal panel which writes data to pixels.

2. Description of the Related Art

Liquid crystal display devices which perform screen display by illuminating a liquid crystal panel with a backlight from the back side has a problem a phenomenon that when a moving picture is displayed images are recognized visually so as to have tails (what is called "moving picture blurring"). To suppress such moving picture blurring, a conventional technique of turning on the backlight in synchronism with data writing to the pixels of the liquid crystal panel was proposed (e.g., JP-A-2001-210122 and JP-A-2003-57622).

In a backlight disclosed in JP-A-2001-210122, a single light guide plate is sectioned into plural blocks and light sources are turned on on a block-by-block basis in accordance with the data writing position of a liquid crystal panel.

A backlight disclosed in JP-A-2003-57622 is equipped with plural light guide plates that are stacked. The light exit area is caused to light divisionally by turning on light sources on a light guide plate basis. This backlight can improve the moving picture characteristics and thereby suppress moving picture blurring because when a moving picture is displayed the light exit area lights divisionally on a block-by-block basis in synchronism with a data writing operation.

JP-T-2003-532273 (The term "JP-T" as used herein means a published Japanese translation of a PCT patent application.) discloses a backlight-related technique for improving the characteristics of light that is output from the light exit area of a light guide plate by detecting light emission quantities of light sources.

As described above, in conventional backlights, to suppress moving picture blurring the light exit area is caused to light divisionally. This results in a problem that the luminance of exit light is prone to be non-uniform among the blocks. This leads to a problem that the manufacturing cost increases if it is attempted to make light that is output from the light exit area uniform among the blocks. In general, in light-emitting elements such as LEDs (light-emitting diodes), the output power is prone to vary with a temperature variation. Therefore, the light emission quantity may vary with an environmental variation. The light emission quantity may also vary with age. Where such light-emitting elements are used for the respective blocks, to make light that is output from the light exit area always uniform among the blocks, it is necessary to detect light emission quantities of light-emitting elements for the respective blocks. To this end, sensors for detecting light emission quantities need to be provided for the respective blocks, which is a factor of increasing the cost of manufacture of a backlight.

The present invention has been made in view of the above circumstances, and an object of the invention is therefore to provide a surface light source device and a liquid crystal display device capable of making light that is output from a light exit area uniform among blocks without increasing the manufacturing cost. In particular, it is an object of the invention is to provide a surface light source device capable of suppressing moving picture blurring in screen display as well as making the luminance of exit light uniform among blocks without the need for providing, block by block, sensors for detecting light emission quantities of light sources on a block-by-block basis.

Another object of the invention is to prevent luminance unevenness and color unevenness in the arrangement direction of point light sources from occurring in a region of a light exit area that is close to the point light sources. In particular, it is an object of the invention is to provide a surface light source device capable of preventing light that is input from each light source to a light guide plate through its end surface from being output directly from a region close to the light source without being diffused sufficiently.

SUMMARY OF THE INVENTION

A surface light source device according to the invention includes light source driving means for driving light sources on a light emission block basis, a light exit area being sectioned into two or more light emission blocks; light quantity detecting means for detecting light quantities on the basis of output light beams that are led out from the two or more light emission blocks, and drive control means for adjusting emission light quantities of the light sources corresponding to the respective light emission blocks on the basis of light quantities that are detected during lighting periods when only one of the light emission blocks is lit up that are subjected to light quantity detection by the light quantity detecting means.

With this configuration, light quantities are detected by setting lighting periods when only one light emission block is lit up. Therefore, even with the light quantity detecting means which performs light quantity detection on the basis of output light beams that are led out from the two or more light emission blocks, the emission light quantities can be adjusted by properly detecting emission light quantities of the light sources corresponding to the respective light emission blocks. This makes it possible to make light beams that are output from the respective blocks of the light exit area uniform among the light emission blocks without the need for providing, for the respective light emission blocks, sensors for detecting, for the respective light emission blocks, emission light quantities of the light sources.

Another surface light source device according to the invention is characterized by, in addition to the above features, a feature that it further includes two light guide plates that are sectioned by light reflecting means so as to correspond to the respective light emission blocks and are arranged in a front-rear direction. Further, two or more point light sources are arranged as part of the light sources along an end surface of one end of each of the light guide plates, and light diffusing means is provided on a back surface of the light guide plate in a region closer to the other end. The light diffusing means are formed on opposite sides on the front light guide plate and the rear light guide plate. With this configuration, since the light diffusing means are formed on the opposite sides on the front light guide plate and the rear light guide plate, light beams that are input to the light guide plates through their end surfaces can be output from the entire light exit area. Since the light diffusing means is formed on the side of the other end of each light guide plate that is opposite to the side of the one end where the point light sources are disposed, a phenomenon that light that is input from each point light source to the associated light guide plate through its end surface is directly output from a region close to the point light source without being diffused sufficiently can be prevented. Since input light is output after being diffused sufficiently in each light guide plate, luminance unevenness and color unevenness can be prevented from occurring in regions, close to the point light sources, of the light exit area in the arrangement direction of the point light sources.

Another surface light source device according to the invention is characterized by, in addition to the above features, a feature that it further includes light transmitting means disposed adjacent to an end surface of the other end of each of the light guide plates, for transmitting output light beams of the respective light emission blocks to the light quantity detecting means. With this configuration, output light beams of the two or more light emission blocks can be transmitted properly to the light quantity detecting means. In particular, where the light transmitting means is an optical fiber for collecting output light beams of the respective light emission blocks, the wiring of output light transmission lines can be simplified and hence the efficiency of sensor attachment work can be increased.

Another surface light source device according to the invention is characterized by, in addition to the above features, features that the light transmitting means transmits light beams coming from the respective light guide plates to a single light quantity detecting means, and that the drive control means turns on the individual point light sources in such a manner that lighting periods for the respective light guide plates are deviated from each other. With this configuration, since the individual point light sources are turned on in such a manner that lighting periods for the respective light guide plates are deviated from each other, light quantities of the respective light guide plates can be detected properly by a single light quantity detecting means. Since it is not necessary to provide sensors for the respective light guide plates, the manufacturing cost can further be reduced.

Another surface light source device according to the invention is characterized by, in addition to the above features, a feature that it further includes two or more engagement holes that are formed in the light guide plates so as to extend in their thickness direction and in which the respective point light sources are inserted. With this configuration, since the point light sources are inserted in the respective engagement holes that are formed in the light guide plates so as to extend in their thickness direction, light radiated from each point light source can be input effectively to the associated light guide plate.

Another surface light source device according to the invention is characterized by, in addition to the above features, a feature that each of confronting surfaces of the light guide plates is inclined toward the other end. With this configuration, since the light guide plates can be located closer to each other, the surface light source device can be made thinner. Further, since each of the confronting surfaces of the light guide plates is inclined toward the side of the other end that is opposite to the side of the one end where the point light sources are disposed, light that is input from each point light source to the associated light guide plate can be output effectively to the front side.

Another surface light source device according to the invention is characterized by, in addition to the above features, a feature that each of the point light sources on the side of the one end of each of the light guide plates includes two or more light-emitting elements having different emission colors that are arranged in a thickness direction of the light guide plate. With this configuration, where light obtained by mixing together light beams radiated from two or more light-emitting elements having different emission colors is output from the light exit area, the light-emitting elements are arranged in the thickness direction of the light guide plate, that is, in the light exit direction, a sufficient degree of color mixing can be attained and hence color unevenness can be prevented.

Still another surface light source device according to the invention is characterized by, in addition to the above features, a feature that it further includes a light guide plate for light emission that is sectioned for the respective light emission blocks by light reflecting means and is provided with light diffusing means on its back surface, and a light guide plate for light diffusion provided behind the light guide plate for light emission. Further, the light sources are two or more point light sources that are arranged along an end surface of one end of the light guide plate for light diffusion, and light that is output from an end surface of the other end of the light guide plate for light diffusion is subjected to incidence on an end surface of the light guide plate for light emission by a reflection member and is output from a light exit surface of the light guide plate for light emission. With this configuration, light that is input from each point light source to the light guide plate for light diffusion is diffused sufficiently as it travels through the light guide plate for light diffusion and resulting diffused light is input to the end surface of the light guide plate for light emission. Therefore, luminance unevenness and color unevenness can be prevented from occurring in the arrangement direction of the point light sources.

Another surface light source device according to the invention is characterized by, in addition to the above features, a feature that the drive control means turns on the light sources for the respective light emission blocks in time-series order. With this configuration, since the light sources for the respective light emission blocks are turned on in time-series order, light quantities of the respective light emission blocks can be detected properly by a single sensor.

Another surface light source device according to the invention is characterized by, in addition to the above features, features that it further includes a light diffusion plate for diffusing light; hollow spaces that are formed behind the diffusion plate and sectioned for the respective light emission blocks by light reflecting means; a reflection member opposed to the diffusion plate with the hollow spaces interposed in between, for reflecting light traveling through the hollow spaces to a front side; two or more point light sources that are arranged along the hollow spaces and serve as the light sources; and a deflection element for outputting light beams coming from the point light sources to the hollow spaces by refracting those toward the reflection member. With this configuration, since light beams to be input from the point light sources to the hollow spaces are refracted toward the reflection member by the deflection element, a phenomenon that input light is directly output from a region of the light exit area that is close to each point light source can be prevented. Since input light beams are output after being diffused sufficiently in the hollow spaces, luminance unevenness and color unevenness can be prevented from occurring in the arrangement direction of the point light sources.

Yet another surface light source device according to the invention is characterized by, in addition to the above features, a feature that it further includes two or more light guide plates that are provided for the respective light emission blocks and have light diffusing means corresponding to the respective light emission blocks on a back side. Further, two or more point light sources are disposed as part of the light sources along an end surface of one end of each of the light guide plates and the light diffusing means is formed in a region closer to the other end.

With this configuration, since the light diffusing means are formed on the light guide plates so as to correspond to the light emission blocks, respectively, the light exit area can be lit up on a light emission block basis. Since each light diffusing means is formed on the side of the other end that is opposite to the side of the one end where the point light sources are disposed, a phenomenon that light that is input from each point light source to the associated light guide plate through its end surface is directly output from a region close to the point light source without being diffused sufficiently can be prevented. Since input light is output after being diffused sufficiently in each light guide plate, luminance unevenness and color unevenness can be prevented from occurring in regions, close to the point light sources, of the light exit area in the arrangement direction of the point light sources.

Another surface light source device according to the invention is characterized by, in addition to the above features, a feature that part of the light guide plates in which the light diffusing means is formed in a region closer to the center are disposed on the front side. With this configuration, since the light guide plates for lighting up the light emission blocks closer to the center among the light emission blocks formed by the respective light diffusing means are located on the front side, the luminance of exit light of a central portion of the light exit area can effectively be made higher than that of a peripheral portion.

Another surface light source device according to the invention is characterized by, in addition to the above features, a feature that an end surface of the other end of each of the light guide plates is inclined toward the back side and the light diffusing means is formed on the end surface. With this configuration, since the end surfaces of the other ends are inclined toward the back side, new spaces are formed behind the light guide plates. Therefore, the point light sources for the back-side light guide plates can be disposed in one of those spaces. This makes it possible to narrow the frame area of the surface light source device.

Another surface light source device according to the invention is characterized by, in addition to the above features, a feature that it further includes two or more light source units that are provided for the respective light emission blocks and each of which includes a light guide plate for light emission having a light diffusing means on its back surfaces and a light guide plate for light diffusion disposed behind the light guide plate for light emission. Further, the light sources include two or more point light sources disposed along an end surface of one end of the light guide plate for light diffusion, and light that is output from an end surface of the other end of the light guide plate for light diffusion is caused to subjected to incidence on an end surface of the light guide plate for light emission by a reflection member and is output from a light exit surface of the light guide plate for light emission.

A further surface light source device according to the invention is characterized by, in addition to the above features, features that it further includes a light diffusion plate for diffusing light; and two or more light source units provided for the respective light emission blocks, each of the light source units including a hollow space formed behind the diffusion plate, a reflection member opposed to the diffusion plate with the hollow space interposed inbetween, for reflecting light traveling through the hollow space to a front side; two or more point light sources that are arranged along the hollow space and serve as part of the light sources; and a deflection element for outputting light beams coming from the point light sources to the hollow space by refracting it toward the reflection member.

A liquid crystal display device according to the invention includes a liquid crystal panel having a TFT array substrate, for writing data to pixels on a gate line basis on the basis of an image signal; and a backlight for illuminating the liquid crystal panel from a back side in synchronism with a data write operation that is performed on a gate line basis, the backlight including light source driving means for driving light sources on a light emission block basis, a light exit area being sectioned into two or more light emission blocks; light quantity detecting means for detecting light quantities on the basis of output light beams that are led out from the two or more light emission blocks; and drive control means for adjusting emission light quantities of the light sources corresponding to the respective light emission blocks on the basis of light quantities that are detected during lighting periods when only one of the light emission blocks is lit up that are subjected to light quantity detection by the light quantity detecting means. Further, the drive control means lights up the light emission blocks in accordance with data write positions corresponding to respective gate lines.

In the surface light source device and the liquid crystal display device according to the invention, the light quantity detecting means which performs light quantity detection on the basis of output light beams that are led out from the two or more light emission blocks adjusts the emission light quantities by properly detecting emission light quantities of the light sources corresponding to the respective light emission blocks. This makes it possible to make light beams that are output from the respective light emission blocks of the light exit area uniform among the light emission blocks without the need for providing, for the respective light emission blocks, sensors for detecting, for the respective light emission blocks, emission light quantities of the light sources. This in turn makes it possible to suppress moving picture blurring in screen display as well as to make the luminance of exit light always uniform among the blocks without increasing the manufacturing cost.

Since each light diffusing means is formed on the side of the other end that is opposite to the side of the one end where the point light sources are disposed, a phenomenon that light that is input from each point light source to the associated light guide plate through its end surface is directly output from a region close to the point light source without being diffused sufficiently can be prevented. Since light that is input to each light guide plate through its end surface is output after being diffused sufficiently in the light guide plate, luminance unevenness and color unevenness can be prevented from occurring in regions, close to the point light sources, of the light exit area in the arrangement direction of the point light sources.

DETAILED DESCRIPTION OF THE INVENTION

Embodiment 1

Figure 1:
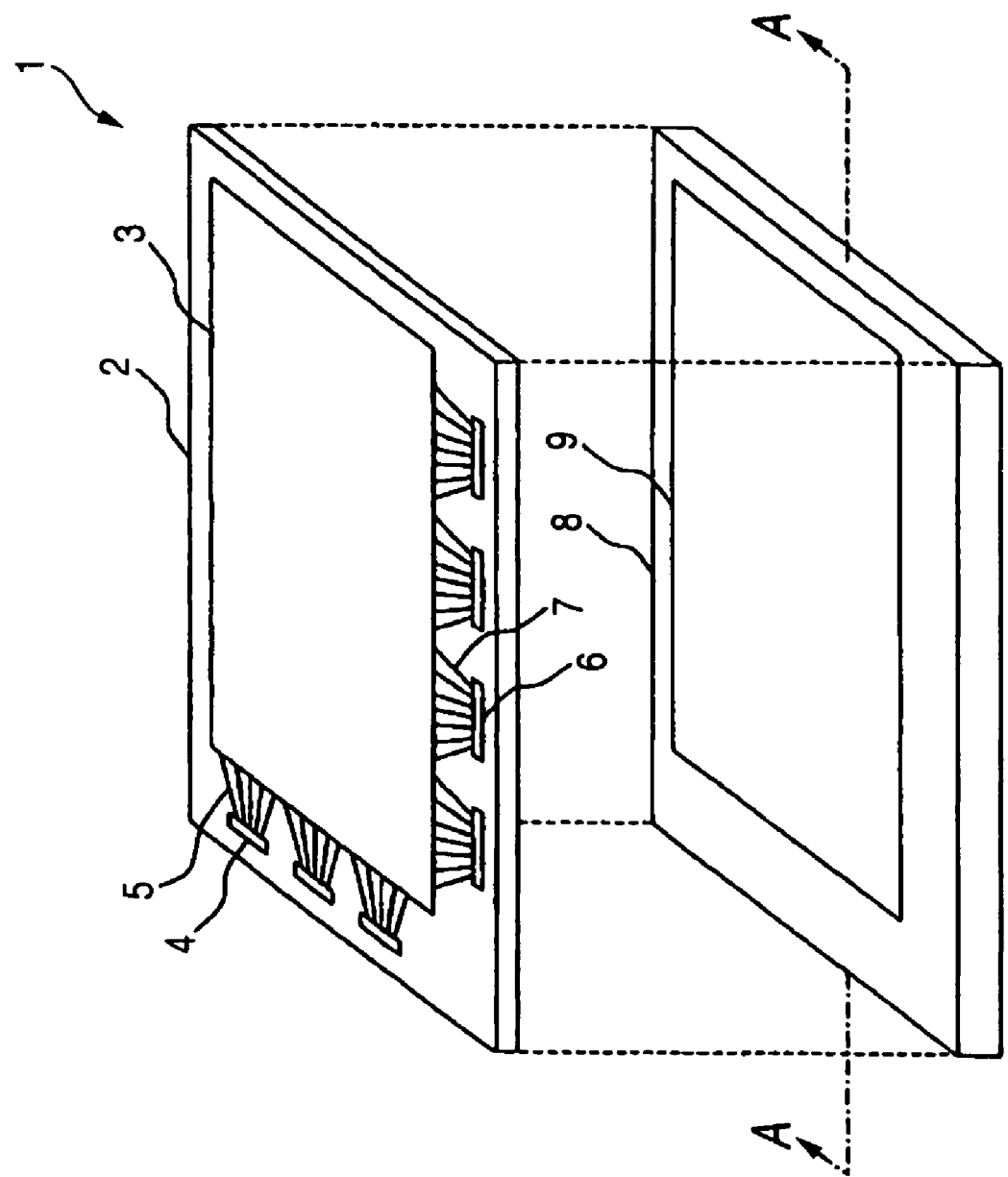
FIG. 1 is a schematic perspective view showing the configuration of an exemplary liquid crystal display device according to a first embodiment of the present invention.

FIG. 1 is a schematic perspective view showing the configuration of an exemplary liquid crystal display device according to a first embodiment of the present invention, that is, a liquid crystal display device 1 that is composed of a liquid crystal panel 2 for a data writing operation on pixels and a backlight 8 for illuminating the liquid crystal panel 2 from the back side in synchronism with the data writing operation. The liquid crystal display device 1 according to this embodiment is a thin liquid crystal display that is superior in moving picture display characteristics and has a narrow frame area.

The liquid crystal panel 2 is a transmission-type display device having a counter substrate and a TFT (thin-film transistor) array substrate that hold a liquid crystal inbetween. A large number of pixels are arranged in matrix form in a display area 3 that is formed in the panel surface. In this example, the display area 3 has an oblong, rectangular shape and gate lines (also called address lines) 5 and source lines (also called data lines) 7 are formed parallel with the longer sidelines and the shorter sidelines, respectively.

Plural gate line drivers 4 for turning on/off TFTs as semiconductor switching elements provided for the respective pixels and plural source line drivers 6 for supplying image data to the pixels via the TFTs are formed around the display area 3. For example, the drivers 4 and 6 are formed on the TFT array substrate in the form of semiconductor chips. Data are written to the pixels by a controller that controls the drivers 4 and 6. Data writing to the pixels is performed on the basis of image signals, and image data are written to the pixels on a gate line 5 basis, that is, through each gate lines 5 that is on-driven in a prescribed scanning cycle.

The backlight 8 is a surface light source device for outputting uniform light through an opening 9 formed in a body, and is disposed behind the liquid crystal panel 2. The backlight 8 illuminates the liquid crystal panel 2 in such a manner that its light exit area is sectioned into plural blocks that correspond to data writing positions of the gate lines 5 of the liquid crystal panel 2. The opening 9 is a little lager than the display area 3. That is, the opening 9 has an oblong, rectangular shape whose sidelines parallel with the gate lines 5 of the liquid crystal panel 2 are longer sidelines.

Figure 2:
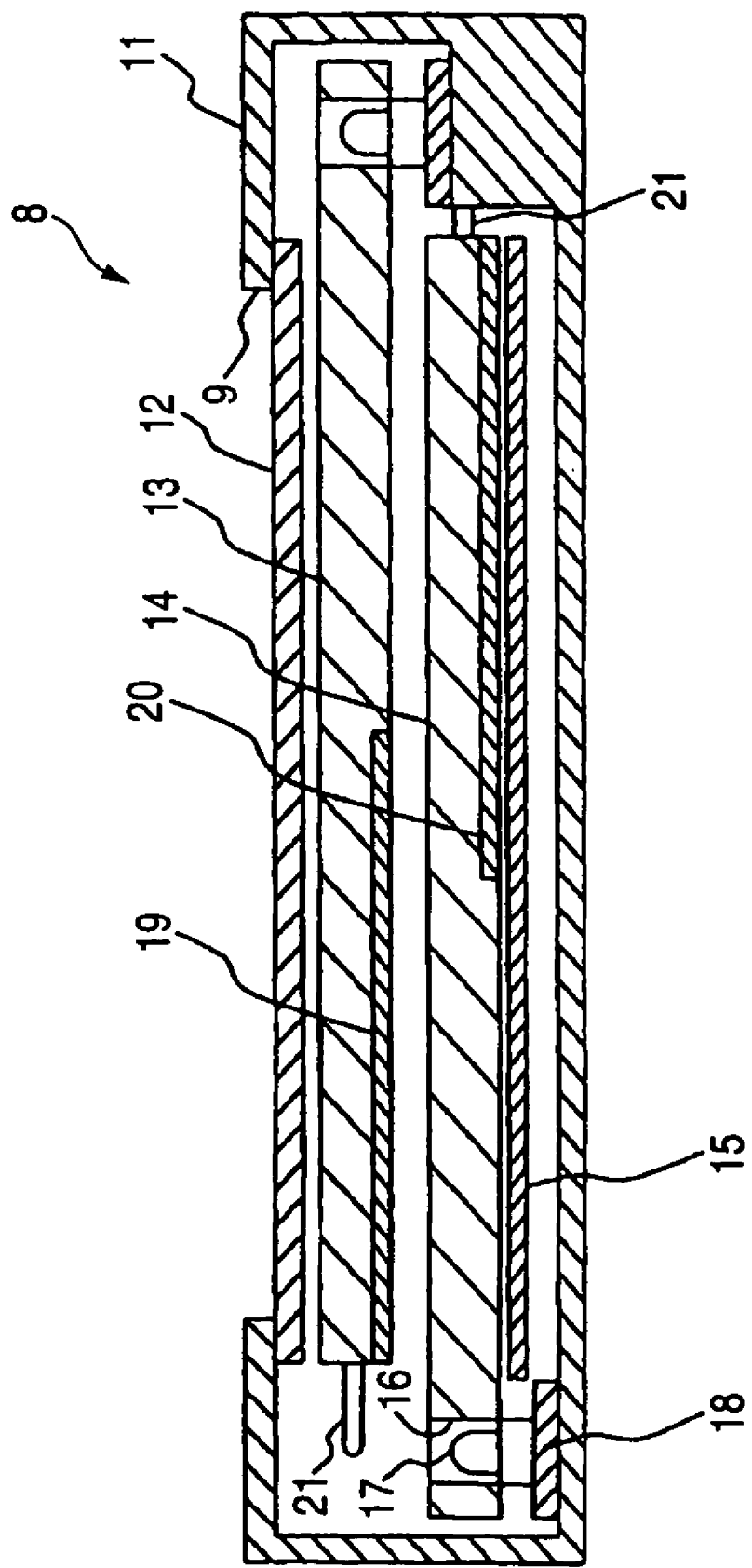
FIG. 2 is a sectional view taken along line A-A in FIG. 1 and shows the details (example) of an important part of the liquid crystal display device of FIG. 1, that is, the inside of the backlight 8.

FIG. 2 is a sectional view taken along line A-A in FIG. 1 and shows the details (example) of an important part of the liquid crystal display device of FIG. 1, that is, the inside of the backlight 8. The backlight 8 is composed of a body 11, an optical sheet 12, two light guide plates 13 and 14, a reflection sheet 15, and plural point light sources 17. The body 11 is a frame for accommodating and holding the above members and is made of a synthetic resin or a metal that is strong and superior in workability. In particular, from the viewpoint of dissipation of heat that is generated by light emission of the point light sources 17, it is desirable that the body 11 be made of aluminum or copper that is superior in thermal conductivity. The front plate of the body 11 is formed with the opening 9 as the light exit area.

The optical sheet 12 is a transparent, sheet-like optical member such as a diffusion sheet that diffuses light or a prism sheet that is formed with a prism array. The diffusion sheet is formed by mixing a fine reflection material into a transparent member made of a synthetic resin or glass or roughening its surface. To obtain a desired luminance distribution and chromaticity distribution of exit light, plural kinds of optical sheets 12 are used in combination or plural optical sheets 12 of the same kind are used if necessary. The optical sheet 12 is disposed in front of the light guide plates 13 and 14.

Each of the light guide plates 13 and 14 is an optical member for causing light coming from the point light sources 17 disposed along one end surface to be output from the front surface. Each of the light guide plates 13 and 14 is a transparent, flat-plate-like member made of glass or an organic resin such as an acrylic resin or a polycarbonate resin. The light guide plates 13 and 14 are arranged in the front-rear direction behind the optical sheet 12 in such a manner that their light exit areas overlap with each other. Although this example is such that the light exit areas of the light guide plates 13 and 14, which are formed by diffusion patterns (described later), overlap with each other, it is not indispensable that the light exit areas of the light guide plates 13 and 14 overlap with each other.

The back surface of each of the light guide plates 13 and 14 is formed with a diffusion pattern 19 or 20 on the side opposite to the side where the point light sources 17 are disposed. Each of the diffusion patterns 19 and 20 is a light diffusing means for diffusing light traveling through the light guide plate 13 or 14 and thereby outputting it from the front surface of the light guide plate 13 or 14, and is formed by a fine structure such as asperities or cuts.

Specific methods for forming the diffusion patterns 19 and 20 on the back surfaces of the light guide plates 13 and 14 are a method of printing a dot pattern using a white pigment containing titanium oxide and a method of forming a fine pattern of circles, cones, or rectangles in forming the light guide plates 13 and 14. Adjusting the diffusion patterns 19 and 20 makes it possible to realize a desired luminance profile in the direction that is perpendicular to the arrangement direction of the point light sources 17, that is, parallel with the longer sidelines of the light exit areas. That is, the density of the diffusion patterns 19 and 20 and the shape, size, and depth of their elements are determined so as to optimize the luminance profile of exit light.

The diffusion patterns 19 and 20 are formed on the opposite sides on the front light guide plate 13 and the rear light guide plate 14. This makes it possible to output exit light from the entire light exit area, that is, the opening 9 of the body 11 and to elongate the distances between each array of point light sources 17 and the diffusion pattern 19 or 20. The latter advantage makes it possible to sufficiently diffuse light entering the light guide plate 13 or 14 from each point light source 17 in the arrangement direction of the point light sources 17. This prevents incident light from being output directly from an area close to the point light sources 17 without being diffused sufficiently.

The diffusion pattern 19 that is formed on the front light guide plate 13 and the diffusion pattern 20 that is formed on the rear light guide plate 14 may overlap with each other at the center of the light axis area. In this example, it is assumed that two or more point light sources 17 are arranged along the shorter sideline of each of the light guide plates 13 and 14.

Each of the light guide plates 13 and 14 is formed with two or more engagement holes 16 in which the respective point light sources 17 are disposed. Each engagement hole 16 is formed so as to extend in the thickness direction of the light guide plate 13 or 14 and a point light source 17 is inserted into it from the back side. Disposing the point light sources 17 in the engagement holes 16 allows light emitted from the point light sources 17 to be input to the light guide plates 13 and 14 effectively.

No particular limitations are imposed on the shape of the engagement holes 16: they may assume a circular shape, a rectangular shape, a hexagonal shape, or the like. Each engagement hole 16 may either penetrate through the light guide plate 13 or 14 or have only a single opening. The inside surface of each engagement hole 16 is subjected to smoothing processing for lowering the degree of asperity such as mirror-finishing, which allows light emitted from the associated point light source 17 to be input to the light guide plate 13 or 14 effectively. The inside surface is perpendicular to the front surface and the back surface of the light guide plate 13 or 14. The engagement holes 16 are formed for the respective point light sources 17.

Each point light source 17 is a point-like light source that is a light-emitting element such as an LED (light-emitting diode), an LD (laser diode), or an EL (electroluminescence) element and is capable of high-speed switching (several milliseconds or faster). In this example, it is assumed that plural kinds (different in color) of single-color LEDs are used in combination.

For example, R (red), G (green), and B (blue) LEDs are used to constitute a point light source 17. The hue of exit light can be changed easily by adjusting the quantities of light emitted from the LEDs of the respective colors. Further, the color reproduction performance of screen display of the liquid crystal panel 2. The point light sources 17 are mounted on printed circuit boards 18 so as to project from them, and are connected to a driver for driving the point light sources 17.

The reflection sheet 15 for reflecting, to the front side, light coming from the rear light guide plate 14 is disposed behind the light guide plate 14. The reflection sheet 15 is a sheet-like optical member that is a silver-evaporated flat plate or a white resin plate. To effectively output light emitted from the point light sources 17, it is preferable that the reflectance of the reflection sheet 15 be 90% or more.

Figure 3:
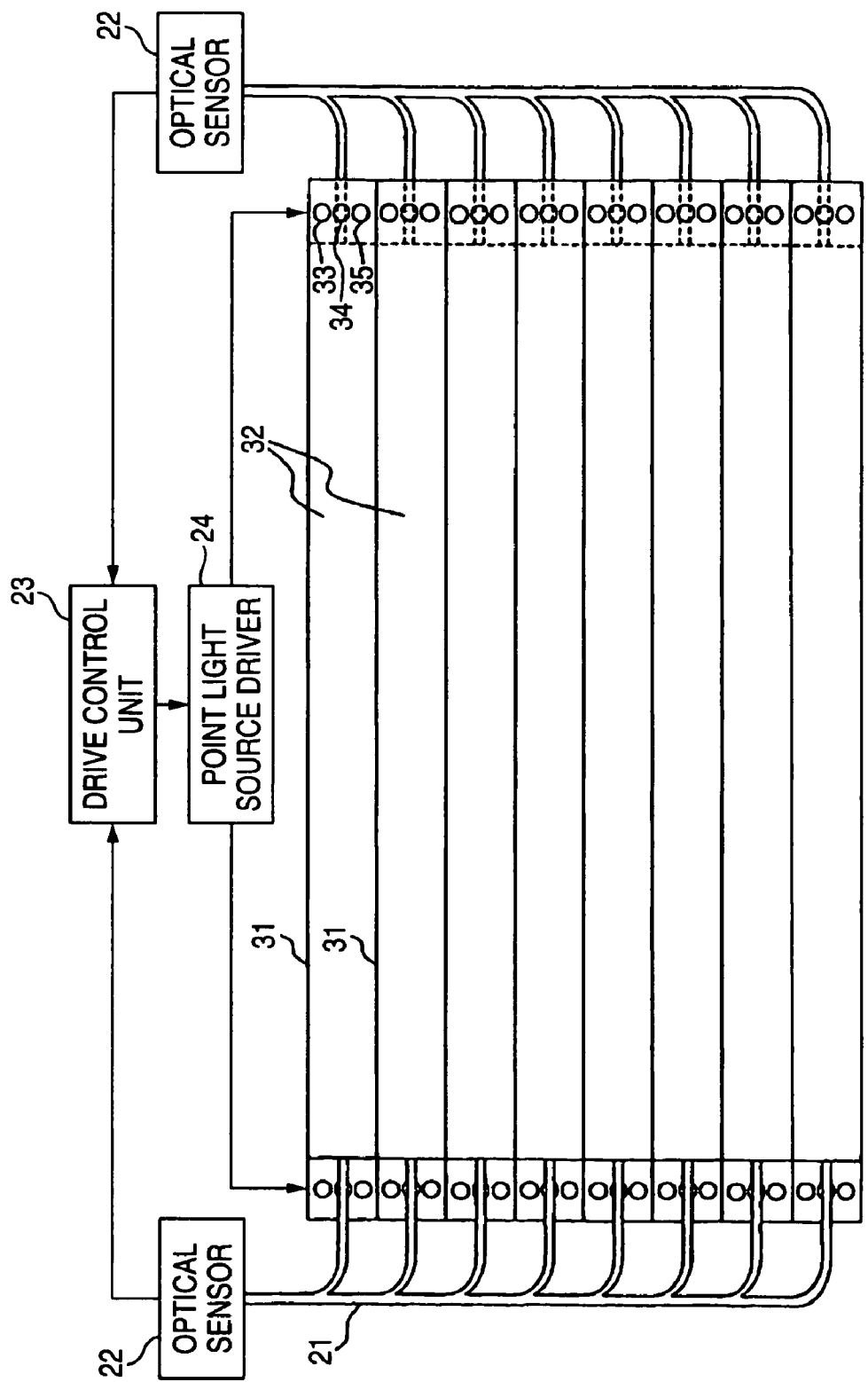
FIG. 3 is a plan view showing an exemplary configuration of an important part of the backlight of FIG. 2.
Figure 4:
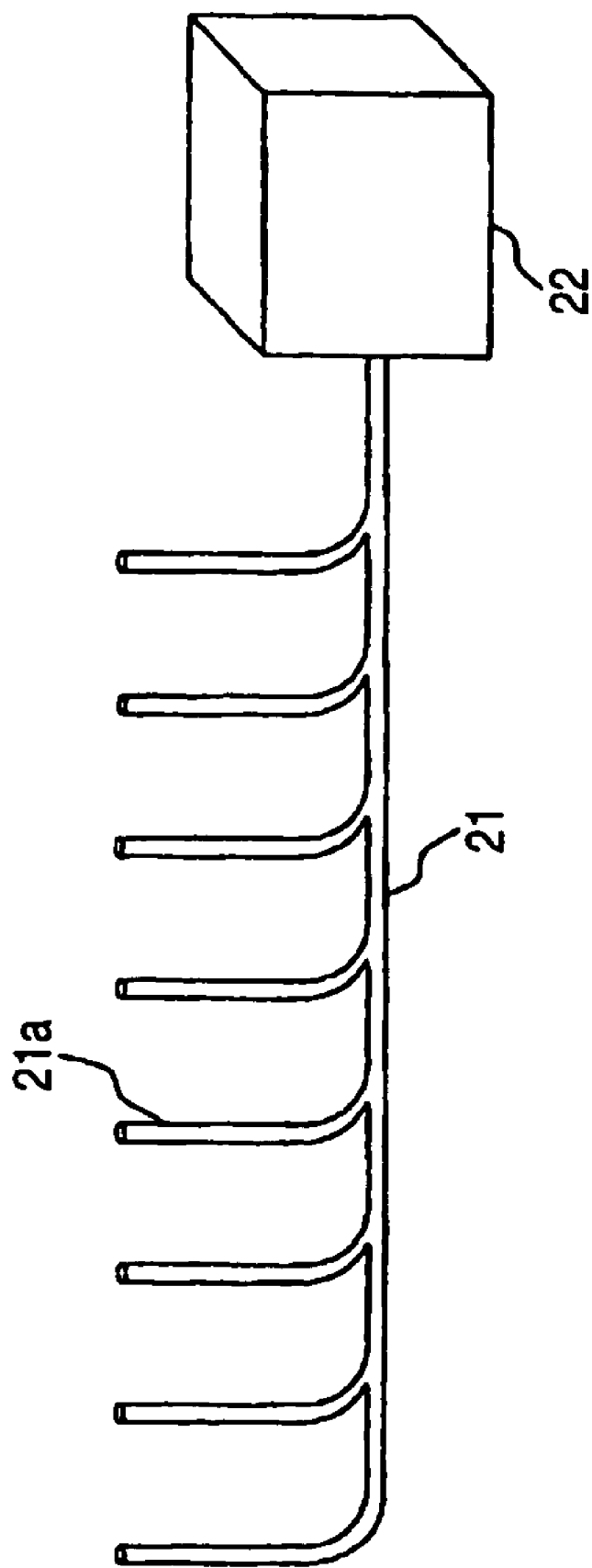
FIG. 4 shows an exemplary structure of an important part of the backlight of FIG. 2, and an appearance of each set of an optical fiber 21 and an optical sensor 22.

FIG. 3 is a plan view showing an exemplary configuration of an important part of the backlight 8 of FIG. 2, and shows the light guide plates 13 and 14 each of whose light exit areas is sectioned into plural light emission blocks 32 and optical fibers 21 for transmitting output light beams of the respective light emission blocks 32 to optical sensors 22. FIG. 4 shows an exemplary structure of an important part of the backlight 8 of FIG. 2, and shows an appearance of each set of an optical fiber 21 and an optical sensor 22.

Each of the light guide plates 13 and 14 is sectioned into the two or more light emission blocks 32 by means of side reflection plates 31 that are disposed parallel with the side surfaces of the light guide plate 13 or 14. The light emission blocks 32 are band-like regions extending along the longer sidelines of the light guide plate 13 or 14, that is, along the gate lines 5 of the liquid crystal panel 2, and are obtained by sectioning the light exit area at regular intervals.

Each side reflection plate 31 is a light reflecting means for reflecting light traveling through a light emission block 32 back to it, and may be such an optical member as a silver-evaporated flat plate. The light emission blocks 32 are formed by disposing the side reflection plates 31 so as to be opposed to the side surfaces of the light guide plate 13 or 14 and the cutting surfaces parallel with those side surfaces with air layers interposed in between or to be formed directly on the side surfaces of the light guide plate 13 or 14 and the cutting surfaces parallel with those side surfaces without intervention of air layers using transparent adhesive members. Alternatively, the light emission blocks 32 may be formed by evaporating silver on the side surfaces of the light guide plate 13 or 14 and the cutting surfaces parallel with those side surfaces.

In this example, it is assumed that R, G, and B LEDs 33-35 are provided as a point light source 17 in each light emission block 32. That is, three LEDs 33-35 having different colors are provided in each block 32. The LEDs 33-35 are driven by a point light source driver 24 on a light emission block 32 basis.

Each optical sensor 22 is a light quantity detecting means for detecting light quantities on the basis of output light beams that are led out from the respective light emission blocks 32. The optical sensors 22 are provided for the respective light guide plates 13 and 14, and output light beams of the light guide plates 13 and 14 are transmitted by the respective optical fibers 21. Each optical fiber 21 is a light transmitting means for transmitting output light beams of the respective light emission blocks 32 to the associated optical sensor 22, and is disposed adjacent to the end surface, opposite to the point light source 17-side end surface, of the associated light guide 13 or 14.

Each optical fiber 21 branches so as to assume a comb shape, and the tip faces of respective branches 21*a* are opposed to the end surface of the associated light guide plate 13 or 14. Output light beams of the respective light emission blocks 32 that are input to the optical fiber 21 through the tip faces of the respective branches 21*a* are collected and output to the associated optical sensor 22. The optical fiber 21 uniformly mixes output light beams of the respective light emission blocks 32 that are input simultaneously and outputs resulting light. This makes it possible to simplify the wiring of transmission lines for output light beams and to thereby increase the efficiency of work of attaching the optical sensors 22.

Each optical fiber 21 is a transparent linear member such as glass or an organic resin such as an acrylic resin or a polycarbonate resin. The surface of each optical fiber 21 is mirror-finished so as to prevent light traveling inside from leaking outside. Alternatively, to prevent light traveling inside from leaking outside, each optical fiber 21 may be such that a member having a large refractive index is surrounded by a member having a small refractive index or that the surface is coated with a reflection film.

The above-mentioned point light source driver 24 is drive-controlled by a drive control unit 23 that operates on the basis of light quantity detection results. The drive control unit 23 adjusts the emission light quantities of the point light sources 17 on the basis of the light quantities detected by the optical sensors 22. The emission light quantities are adjusted by setting lighting periods when only one of the light emission blocks 32 whose light quantities are to be detected by each optical sensor 22 is lit up. The emission light quantity of a point light source 17 corresponding to each light emission block 32 is determined on the basis of a light quantity that is detected in the corresponding lighting period. The two light guide plates 13 and 14 are lit up simultaneously.

More specifically, the light quantity of each point light source 17 is adjusted by increasing or decreasing the current flowing through it, the voltage applied to it, or the duty ratio. For example, if the light quantity detected by one of the optical sensor 22 has decreased, a control is made so that the current flowing through the point light source 17 concerned, the voltage applied to the point light source 17 concerned, or the duty ratio is increased. Conversely, if the light quantity detected by one of the optical sensor 22 has increased, a control is made so that the current flowing through the point light source 17 concerned, the voltage applied to the point light source 17 concerned, or the duty ratio is decreased.

Such a feedback control makes it possible to keep the luminance of light that is output from the light exit area at a constant level. Since light quantities are detected by setting lighting periods when one light emission block 32 is lit up, the light emission quantity of each point light source 17 can be adjusted by detecting its light quantity properly though each optical sensor 22 detects light quantities on the basis of output light beams of the plural light emission blocks 32. Therefore, the luminance values of light beams that are output from the respective light emission blocks 32 of the light exit area can be made uniform among the light emission blocks 32 without the need for providing, for the respective light emission blocks 32, sensors for detecting, for the respective light emission blocks 32, the emission light quantities of the point light sources 17.

The above drive control unit 23 performs the control of lighting the light emission blocks 32 in accordance with the data writing positions of the gate lines 5 of the liquid crystal panel 2, whereby moving picture blurring of screen display can be prevented. In general, to suppress moving picture blurring, it is desirable to section the light exit area into four or more parts. It is more desirable to section the light exit area into six to eight parts or more. In this embodiment, the light exit area is sectioned into eight light emission blocks 32. The sectioning number is determined in accordance with the state transition speed of the liquid crystal and the frame period of the liquid crystal panel 2.

Figure 5:
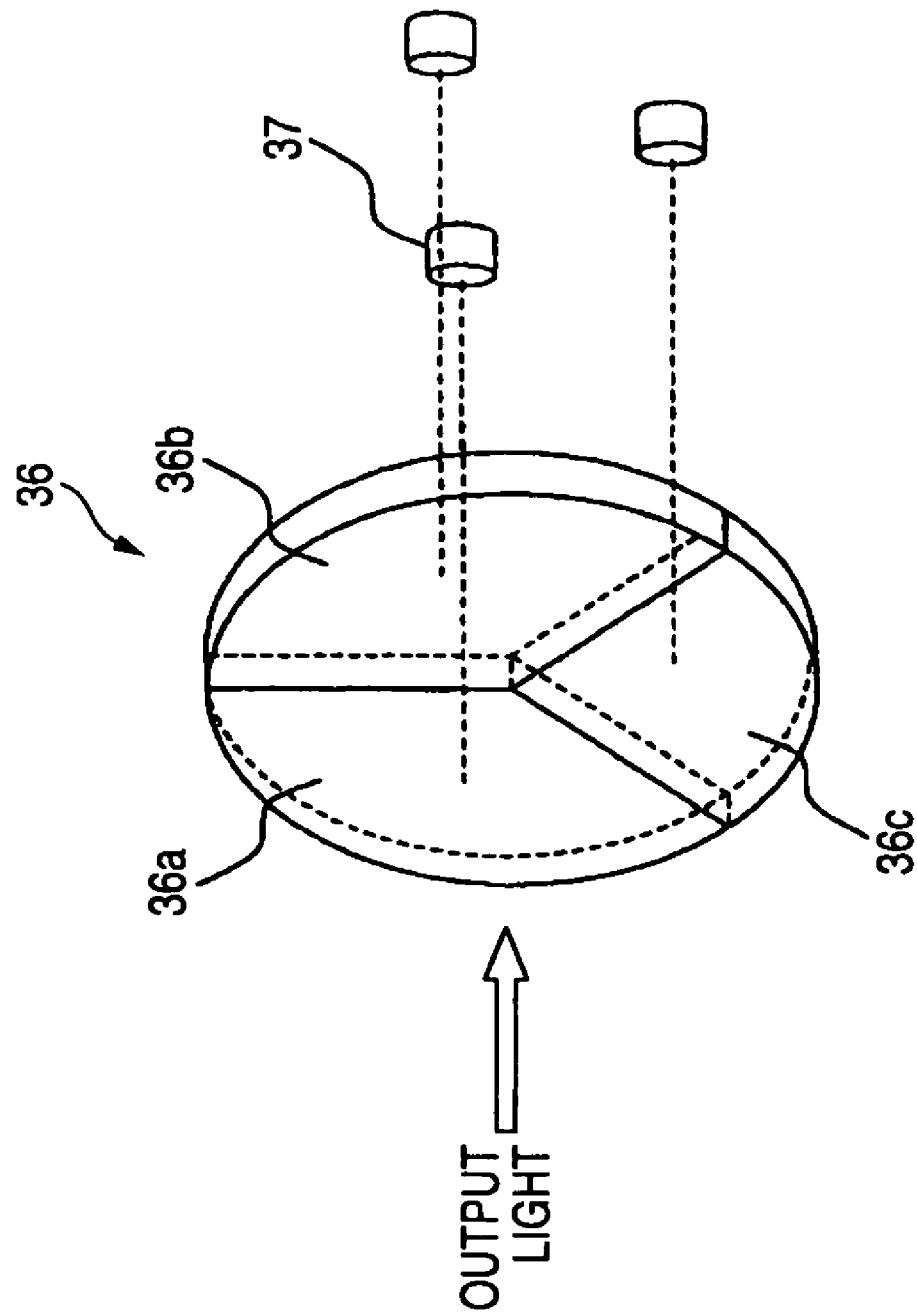
FIG. 5 is a perspective view showing an exemplary structure of an important part of the backlight of FIG. 2.

FIG. 5 is a perspective view showing an exemplary structure of an important part of the backlight 8 of FIG. 2, and shows an optical sensor 22 capable of detecting light quantities of respective color components included in output light. The optical sensor 22 is composed of a filter unit 36 and three light-receiving units 37. Each light-receiving unit 37 is a photodiode and generates an electrical signal commensurate with a reception light quantity.

To be able to detect light quantities of R, G, and B color components included in output light beams of respective light emission blocks 32, the filter unit 36 is a band-pass filter or a light-absorption-type color filter that is formed with a red light transmission region 36*a*, a green light transmission region 36*b*, and a blue light transmission region 36*c*. For example, the filter unit 36 can be implemented by radially dividing a disc-shaped light-absorption-type filter into three equal parts and forming light transmission regions of the respective colors.

The light-receiving units 37 are disposed behind the respective light transmission regions 36*a*-36*c*. The optical sensor 22 having the above structure can detect light quantities of three color components included in output light, and hence makes it possible to adjust the emission light quantities of the three respective LEDs 33-35 that are provided for each light emission block 32. This makes it possible to prevent the hue of the exit light from varying among the light emission blocks 32 even if the output characteristics of the LEDs of the different colors vary differently with the temperature or age.

Although FIG. 4 shows the exemplary optical fiber 21 that collects simultaneously received output light beams of the respective light emission blocks 32 and outputs resulting light to the associated optical sensor 22, other structures may be employed as long as they allow transmission of output light beams of the respective light emission blocks 32 to the associated optical sensor 22.

Figure 6:
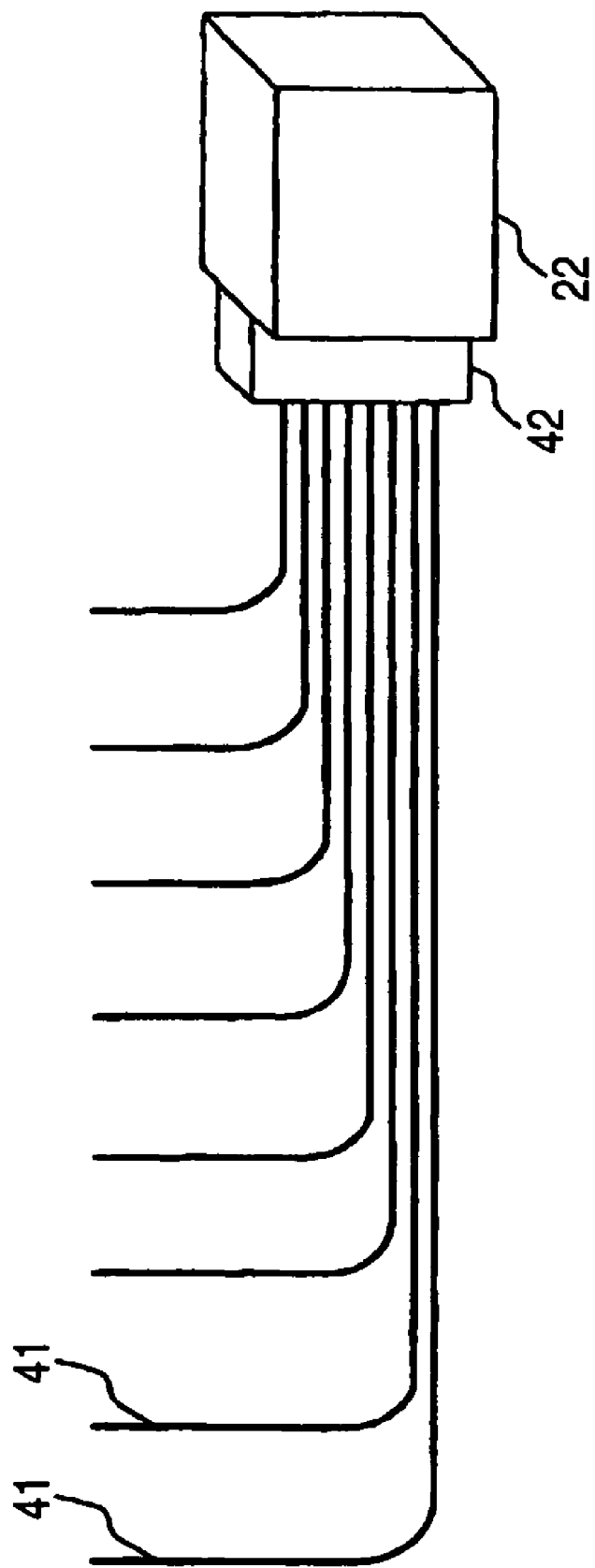
FIG. 6 shows another exemplary structure of an important part of the backlight of FIG. 2.

FIG. 6 shows another exemplary structure of an important part of the backlight 8 of FIG. 2, and shows plural optical fibers 41 for transmitting output light beams of the respective light emission blocks 32 and an optical sensor 22 having a light diffusing means 42. In this example, eight optical fibers 41 are provided for transmission of output light beams of the respective light emission blocks 32.

Output light beams transmitted by the respective optical fibers 41 are input to the optical sensor 22 via the light diffusing means 42. Output light beams of the light emission blocks 32 that are output from the respective optical fibers 41 are input to the optical sensor 22 after being diffused by the light diffusing means 42, which makes it possible to prevent the detection light quantity from varying depending on the connection position of the optical fibers 41 that are connected to the optical sensor 22.

Figure 7:
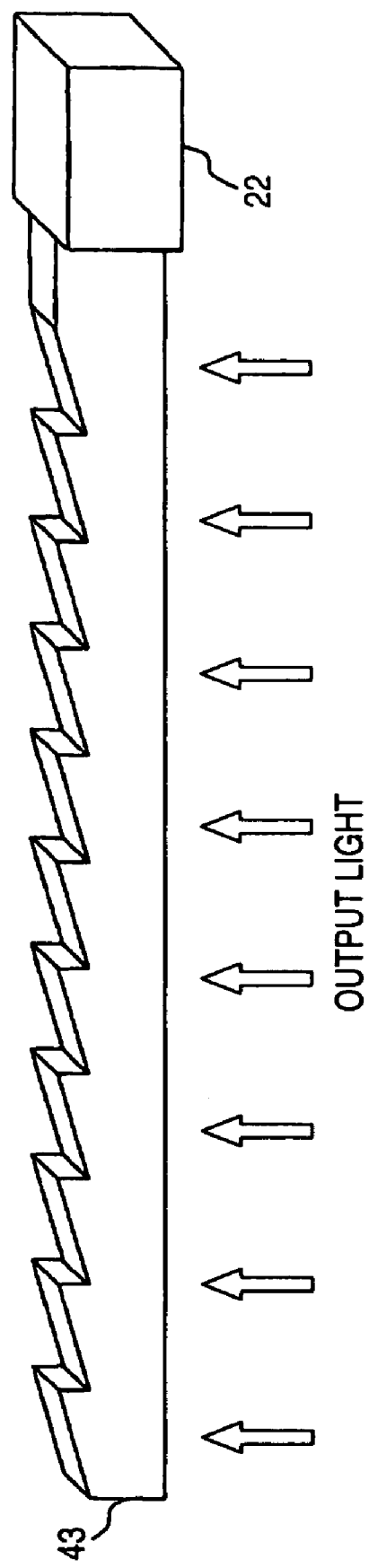
FIG. 7 shows still another exemplary structure of an important part of the backlight of FIG. 2.

FIG. 7 shows still another exemplary structure of an important part of the backlight 8 of FIG. 2, and shows a light guide member 43 for transmitting output light beams of the respective light emission blocks 32 and an optical sensor 22. The light guide member 43 is a light transmitting means for transmitting output light beams of the respective light emission blocks 32 to the optical sensor 22. The light guide member 43 is generally a transparent rectangular rod made of glass or an organic resin such as an acrylic resin or a polycarbonate resin, and its surface that is opposite to the surface opposed to the end surface of the associated light guide plate 13 or 14 is formed with plural slant surfaces that arranged at regular intervals. The slant surfaces may be covered with reflection coatings.

Inclined toward the side opposite to the optical sensor 22, each slant surface reflects, toward the optical sensor 22, output light of the associated light emission block 32 that is input to the light guide member 43. The light guide member 43 having the above structure also makes it possible to uniformly mix output light beams of the respective light emission blocks 32 and to output resulting light to the optical sensor 22.

Figure 8:
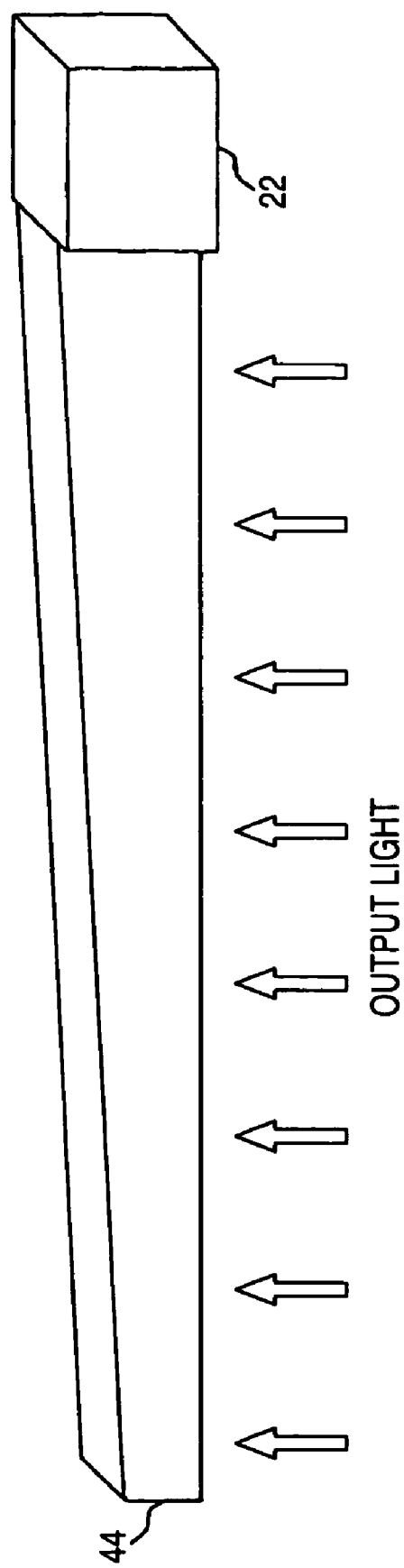
FIG. 8 shows a further exemplary structure of an important part of the backlight of FIG. 2.

FIG. 8 shows a further exemplary structure of an important part of the backlight 8 of FIG. 2, and shows a light guide member 44 for transmitting output light beams of the respective light emission blocks 32 and an optical sensor 22. In this light guide member 44, the surface that is opposite to the surface opposed to the end surface of the associated light guide plate 13 or 14 is inclined at a constant angle. Inclined toward the side opposite to the optical sensor 22, the slant surface reflects, toward the optical sensor 22, output light beams of the light emission blocks 32 that are input to the light guide member 44. The slant surface may be covered with a reflection coating. The light guide member 44 having the above structure also makes it possible to uniformly mix output light beams of the respective light emission blocks 32 and to output resulting light to the optical sensor 22.

Next, a description will be made of a lighting operation of the drive control unit 23 that is performed on a light emission block 32 basis.

Figure 9:
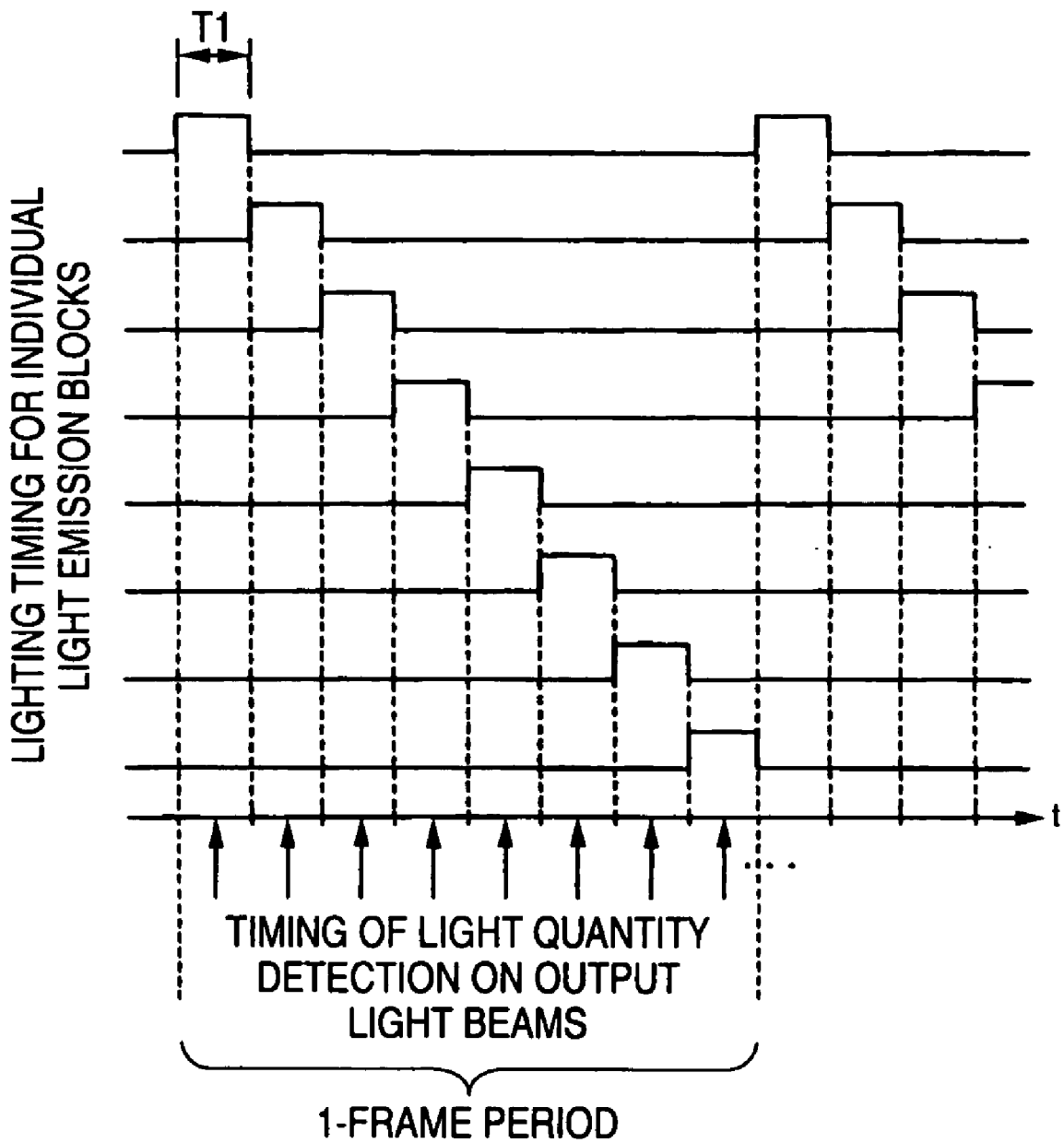
FIG. 9 is a diagram showing an example of lighting timing for individual light emission blocks in the backlight of FIG. 2.

FIG. 9 is a diagram showing another example of lighting timing for the individual light emission blocks 32 in the backlight 8 of FIG. 2, and shows light quantity detection timing in the case where the point light sources 17 for the respective light emission blocks 32 are turned on sequentially. In this exemplary lighting operation, the point light sources 17 are turned on sequentially in such a manner that lighting periods T1 for the respective light emission blocks 32 do not overlap with each other. For example, the light emission blocks 32 are lit up in order from the end of the light exit area. That is, as soon as the lighting period for a certain light emission block 32 finishes, lighting of the next, adjacent light emission block 32 is started.

In this case, since two or more light emission blocks 32 are not lit up simultaneously, a light quantity of output light that is detected in the lighting period of a certain light emission block 32 is a light quantity of the point light source 17 corresponding to the light emission block 32 concerned.

In this example, the lighting period T1 is set at ⅛ of one-frame period of an image signal. The one-frame period is a cycle of data writing to the pixels that is performed on a gate line 5 basis in the liquid crystal panel 2. The light emission blocks 32 are lit up in synchronism with the data writing operation.

Since the light quantity detection is performed by setting lighting periods when only one light emission block 32 is lit up, the emission light quantity can be adjusted by properly detecting the emission light quantity of a point light source 17 corresponding to a light emission block 32 concerned even in the case of using the optical sensor 22 that is connected to the eight light emission blocks 32. This makes it possible to make light emitted from the light exit area on a block-by-block basis always uniform among the light emission blocks 32 without the need for providing, for the respective light emission blocks 32, sensors for detecting, for the respective light emission blocks 32, emission light quantities of the point light sources 17.

Figure 10:
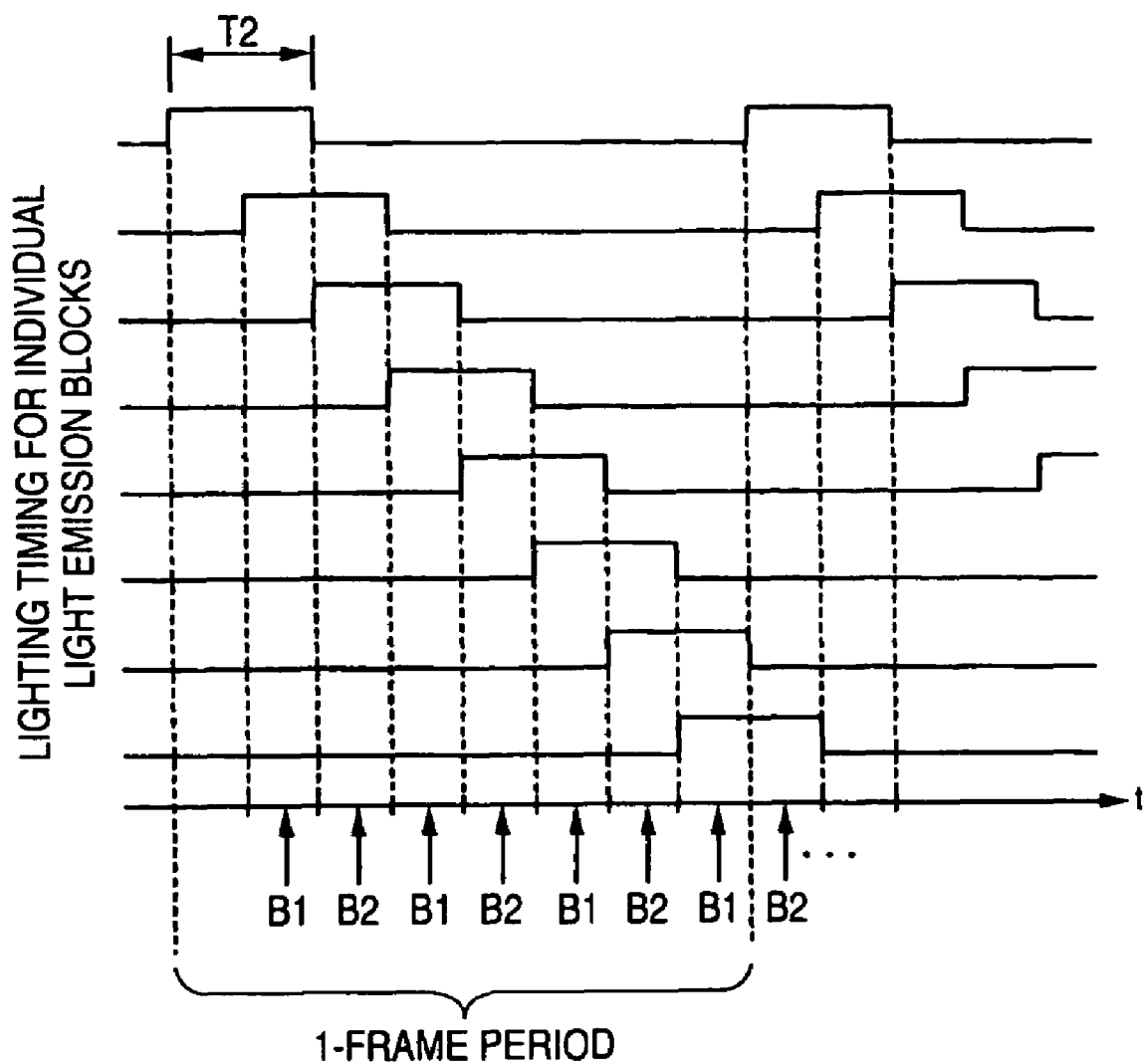
FIG. 10 is a diagram showing another example of lighting timing for individual light emission blocks in the backlight of FIG. 2.

FIG. 10 is a diagram showing another example of lighting timing for the individual light emission blocks 32 in the backlight 8 of FIG. 2, and shows light quantity detection timing in the case where the light emission blocks 32 are lit up sequentially with prescribed overlap periods. In this exemplary lighting operation, to increase the luminance of exit light, the light emission blocks 32 are lit up in such a manner that a lighting period T2 for a certain light emission block 32 and a lighting period for the next light emission block 32 have a prescribed overlap period. For example, as soon as ½ of the lighting period T2 for a certain light emission block 32 finishes, lighting of the next, adjacent light emission block 32 is started.

In this case, two light emission blocks 32 are always lit up. Two or more even-numbered or odd-numbered (in the lighting order) light emission blocks 32 are not lit up simultaneously. Therefore, a light quantity of each light emission block 32 can be detected by causing alternate operation of two optical sensors, that is, an optical sensor (light quantity detection timing B2) connected to only the even-numbered light emission blocks 32 and an optical sensor (light quantity detection timing B1) connected to only the odd-numbered light emission blocks 32. That is, light quantities can be detected on a block-by-block basis by using optical sensors in a number that is the same as the number (overlap number) of light emission blocks 32 that are lit up simultaneously.

Figure 11:
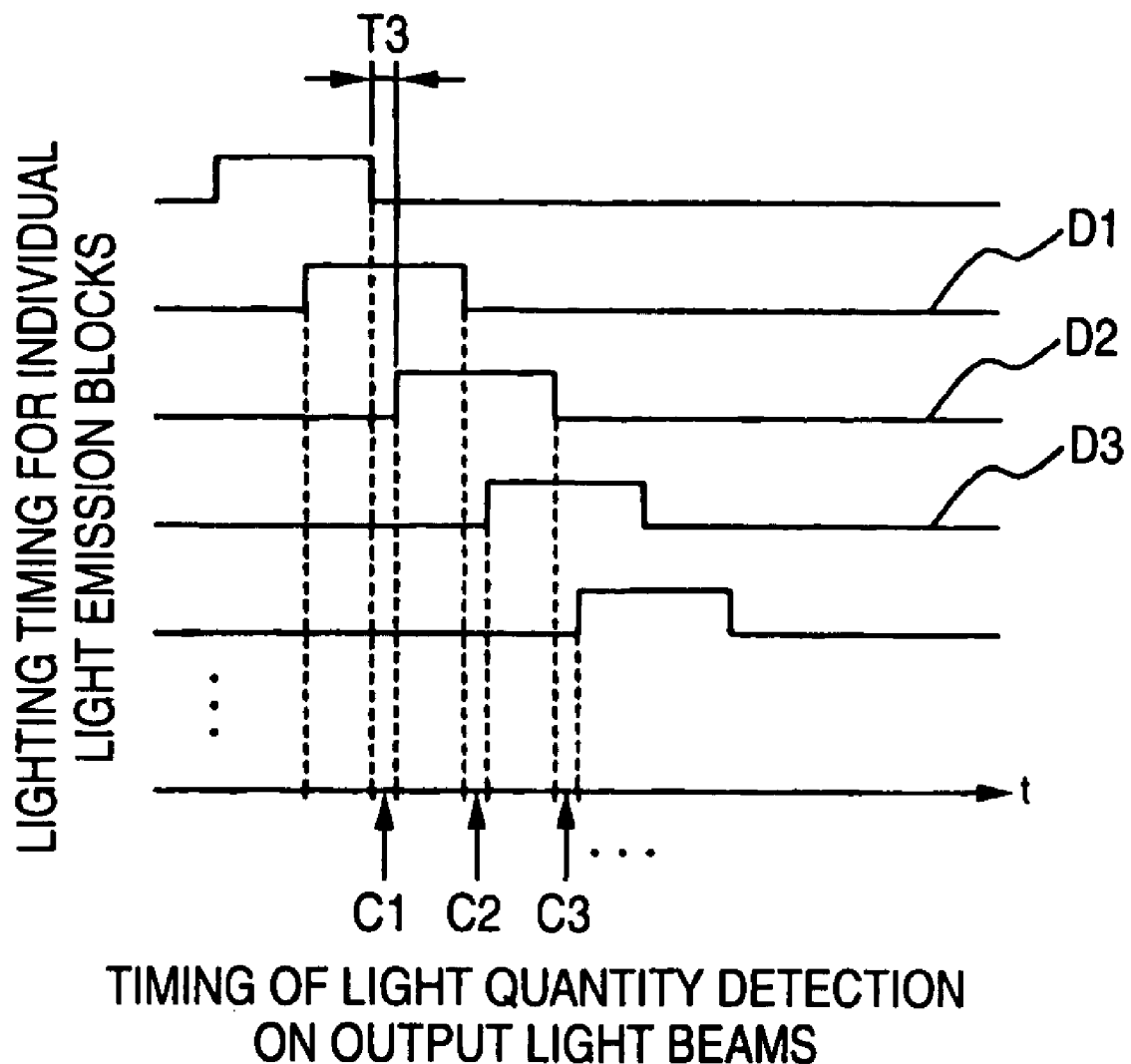
FIG. 11 is a diagram showing still another example of lighting timing for individual light emission blocks in the backlight of FIG. 2.

FIG. 11 is a diagram showing still another example of lighting timing for the individual light emission blocks 32 in the backlight 8 of FIG. 2, and shows light quantity detection timing in the case where the light emission blocks 32 are lit up in shorter lighting periods that overlap with each other. In this exemplary lighting operation, each light emission block 32 is lit up in a lighting period that is shorter than in the above examples by a time T3.

In this case, in a period T3 that starts from the end of lighting of the preceding light emission block D1 and ends at the start of lighting of the next light emission block D3 and in which a certain light emission block D2 is lit up, two or more light emission blocks 32 are not lit up simultaneously. Therefore, a light quantity (light quantity detection timing: C2) of output light that is detected in this period is a light quantity of the point light source 17 corresponding to the light emission block D2 concerned. Since the light quantity detection is performed by setting lighting periods when only one light emission block 32 is lit up, the emission light quantity can be adjusted by properly detecting the emission light quantity of a point light source 17 corresponding to a light emission block 32 concerned even in the case of using the optical sensor 22 that is connected to the eight light emission blocks 32.

Figure 12:
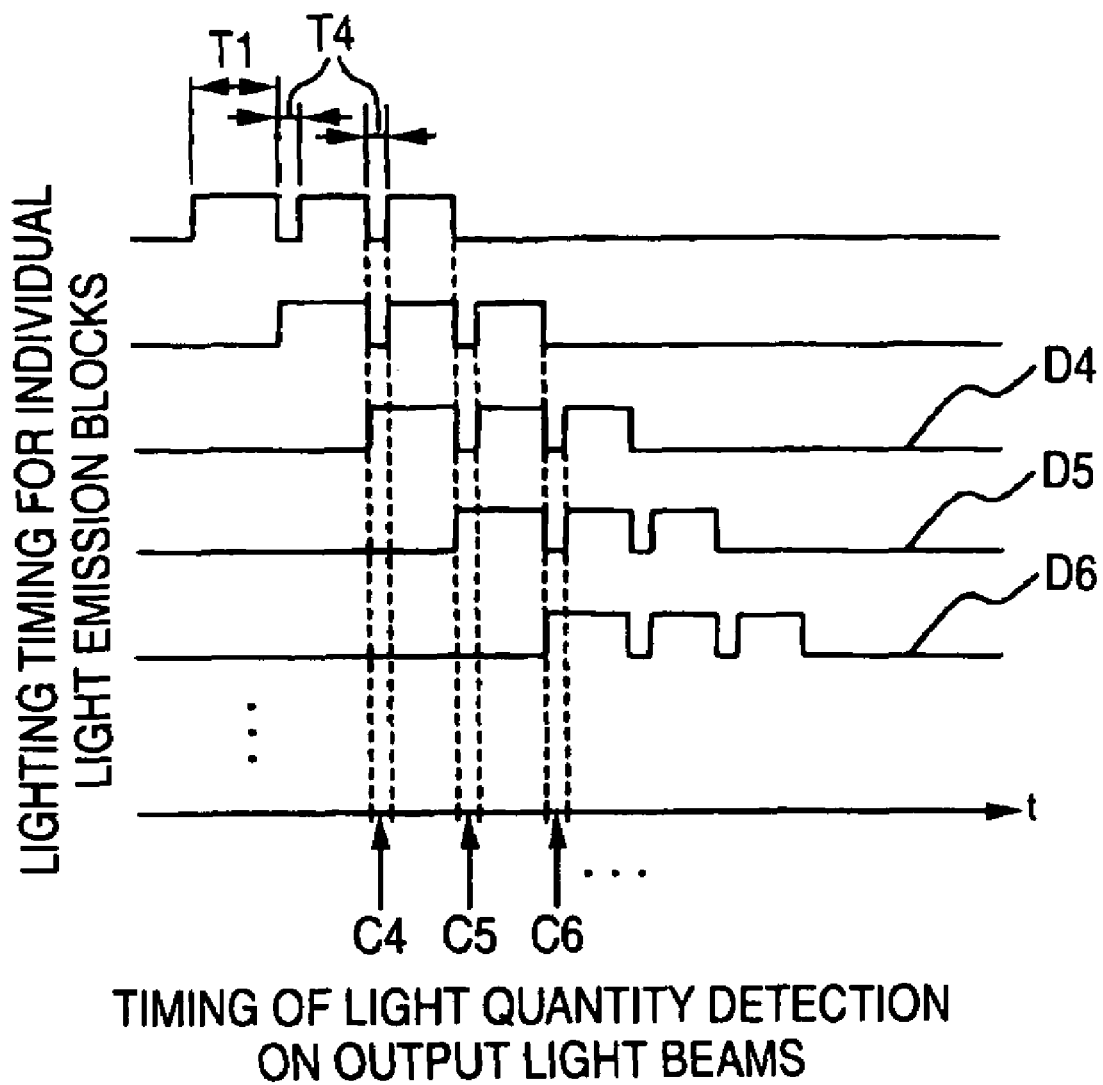
FIG. 12 is a diagram showing a further example of lighting timing for individual light emission blocks in the backlight of FIG. 2.

FIG. 12 is a diagram showing a further example of lighting timing for the individual light emission blocks 32 in the backlight 8 of FIG. 2, and shows light quantity detection timing in the case where the light emission blocks 32 are lit up intermittently with overlap periods. In this exemplary lighting operation, each light emission block 32 is lit up in a lighting period that includes plural non-lighting periods T4.

For example, in a lighting period of a certain light emission block D4, lighting of the next light emission block D5 is started upon a lapse of a lighting period T1. The light emission block D4 is not lit up during the non-lighting periods T4. The light emission blocks D4 and D5 are not lit up during the non-lighting period T4 that starts from a lapse of the lighting period T1 measured from the start of lighting of the light emission block D5, that is, a start of lighting of the second next light emission block D6.

In this case, three light emission blocks 32 are lit up simultaneously. However, two or more light emission blocks 32 are not lit up during the non-lighting period T4. Therefore, a light quantity (light quantity detection timing: C4-C6) of output light that is detected in this period is a light quantity of the point light source 17 corresponding to the light emission block concerned. Since the light quantity detection is performed by setting lighting periods when only one light emission block 32 is lit up, the emission light quantity can be adjusted by properly detecting the emission light quantity of a point light source 17 corresponding to a light emission block 32 concerned even in the case of using the optical sensor 22 that is connected to the eight light emission blocks 32.

Figure 13:
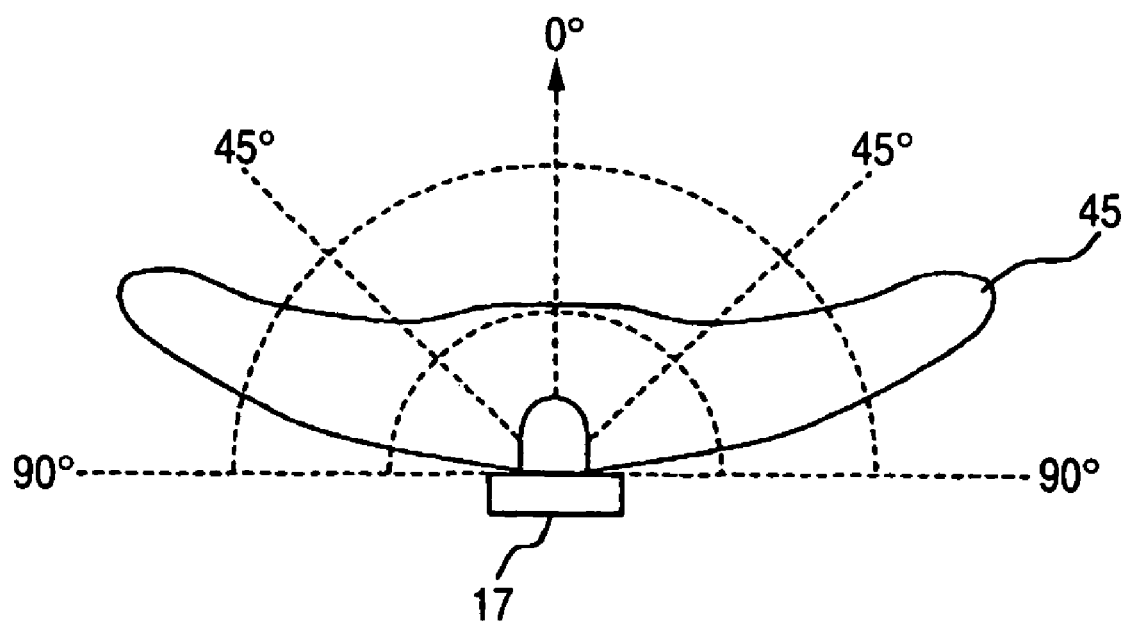
FIG. 13 is a chart illustrating an exemplary operation of a point light source used in the backlight of FIG. 2.

FIG. 13 is a chart illustrating an exemplary operation of a point light source 17 used in the backlight 8 of FIG. 2, and shows a light distribution characteristic curve 45 that is a trace of the distance from the center of a point light source 17 that represents the luminous intensity of the point light source 17 in each direction that is represented by the angle that it forms with the front direction. Each point light source 17, which is mounted on the printed circuit board 18 so as to project from it, is disposed adjacent to the side surface of the associated light guide plate 13 or 14 in such a manner that its projection direction (front direction) points to the front side. For such a point light source 17, from the viewpoint of allowing effective incidence of light on the side surface of the associated light guide plate 13 or 14, it is preferable that the luminous intensity in side directions be higher than in the front direction. The term "luminous intensity" as used herein means the intensity of light radiated from the point light source 17.

More specifically, an LED whose luminous intensity in the range of 70° to 80° is two times or more higher than in the front direction (0°) is used.

According to this embodiment, light beams that are output from the light exit area on a block-by-block basis can be made uniform among the light emission blocks 32 without the need for providing, for the respective light emission blocks 32, optical sensors for detecting, for the respective light emission blocks 32, emission light quantities of the point light sources 17. Further, since light that is input to the light guide plate 13 or 14 is output from it after being diffused sufficiently by the light guide plate 13 or 14, luminance unevenness and color unevenness in the arrangement direction of the point light sources 17 can be prevented from occurring in a region of the light exit area that is close to the point light sources 17. Since luminance unevenness and color unevenness in the arrangement direction can be suppressed, a surface light source device that is higher in luminance than conventional devices can be obtained even in the case of using a smaller number of LEDs 33-35 by increasing the emission light quantities of the point light sources 17.

Although the embodiment is directed to the case that the optical sensors 22 are provided for the respective light guide plates 13 and 14, the invention is not limited to such a case. For example, light quantities of the arrays of point light sources 17 for the respective light guide plates 13 and 14 can be detected by a single optical sensor by, for example, turning on the point light sources 17 in such a manner that the lighting periods corresponding to the respective light guide plates 13 and 14 are deviated from each other.

Figure 14:
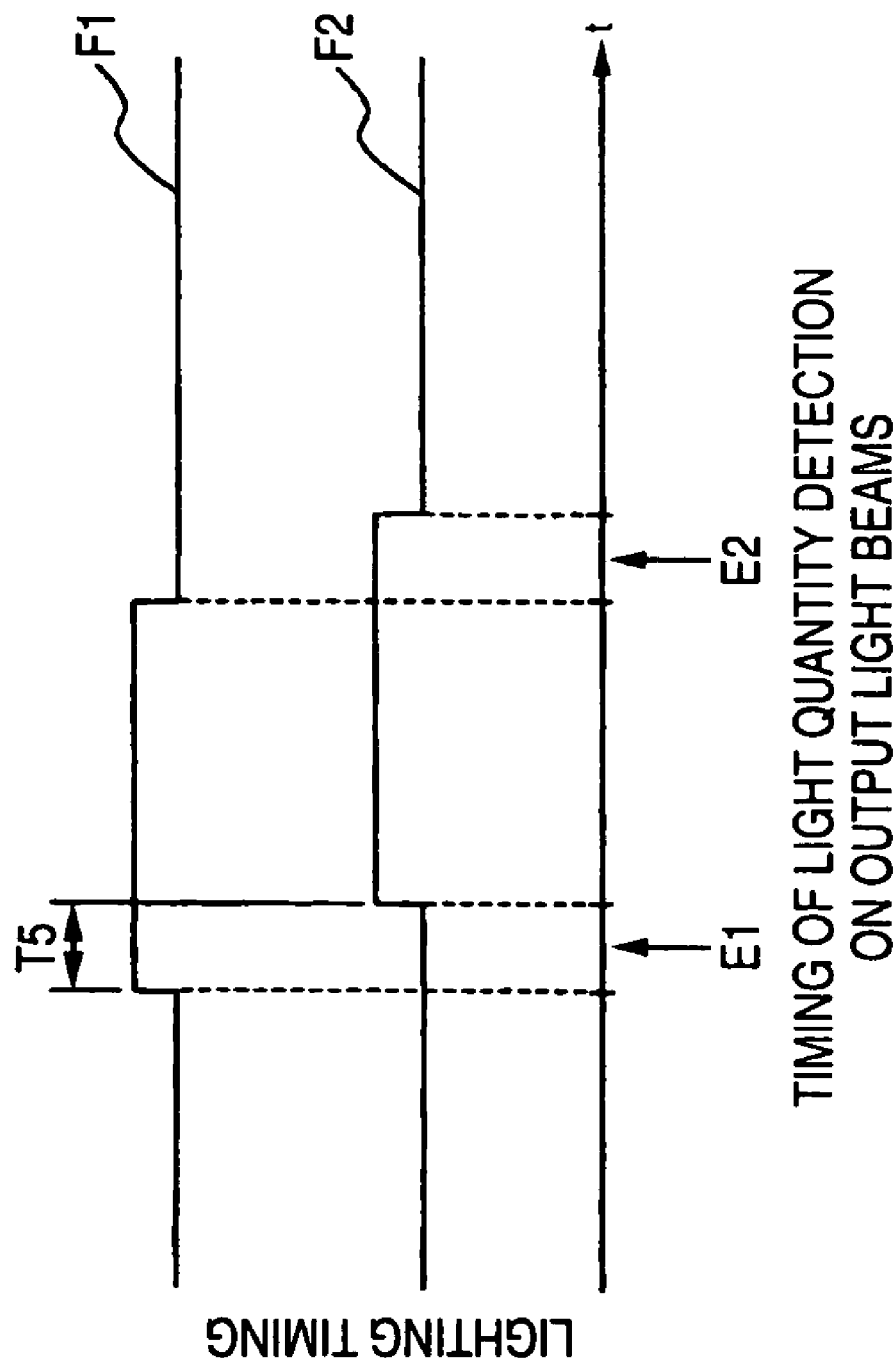
FIG. 14 is a diagram showing an example of lighting timing for the individual light guide plates of the backlight of FIG. 2.

FIG. 14 is a diagram showing an example of lighting timing for the individual light guide plates 13 and 14 of the backlight 8 of FIG. 2, and shows light quantity detection timing in the case where the point light sources 17 are turned on in such a manner that lighting periods corresponding to the respective light guide plates 13 and 14 are deviated from each other. In this exemplary lighting operation, the light guide plates 13 and 14 are lit up in such a manner that their lighting periods are deviated from each other by a time T5. For example, lighting of a light guide plate F2 is started after a lapse of the time T5 from a start of lighting of a light guide plate F1.

In this case, only one of the two light guide plates F1 and F2 is lit up during the period T5 from the start of lighting of the light guide plate F1 to the start of lighting of the light guide plate F2. Therefore, light quantities of the respective light guide plates F1 and F2 can be detected by a single optical sensor by detecting light quantities of output light beams in these periods (light quantity detection timing: E1 and E2).

Figure 15:
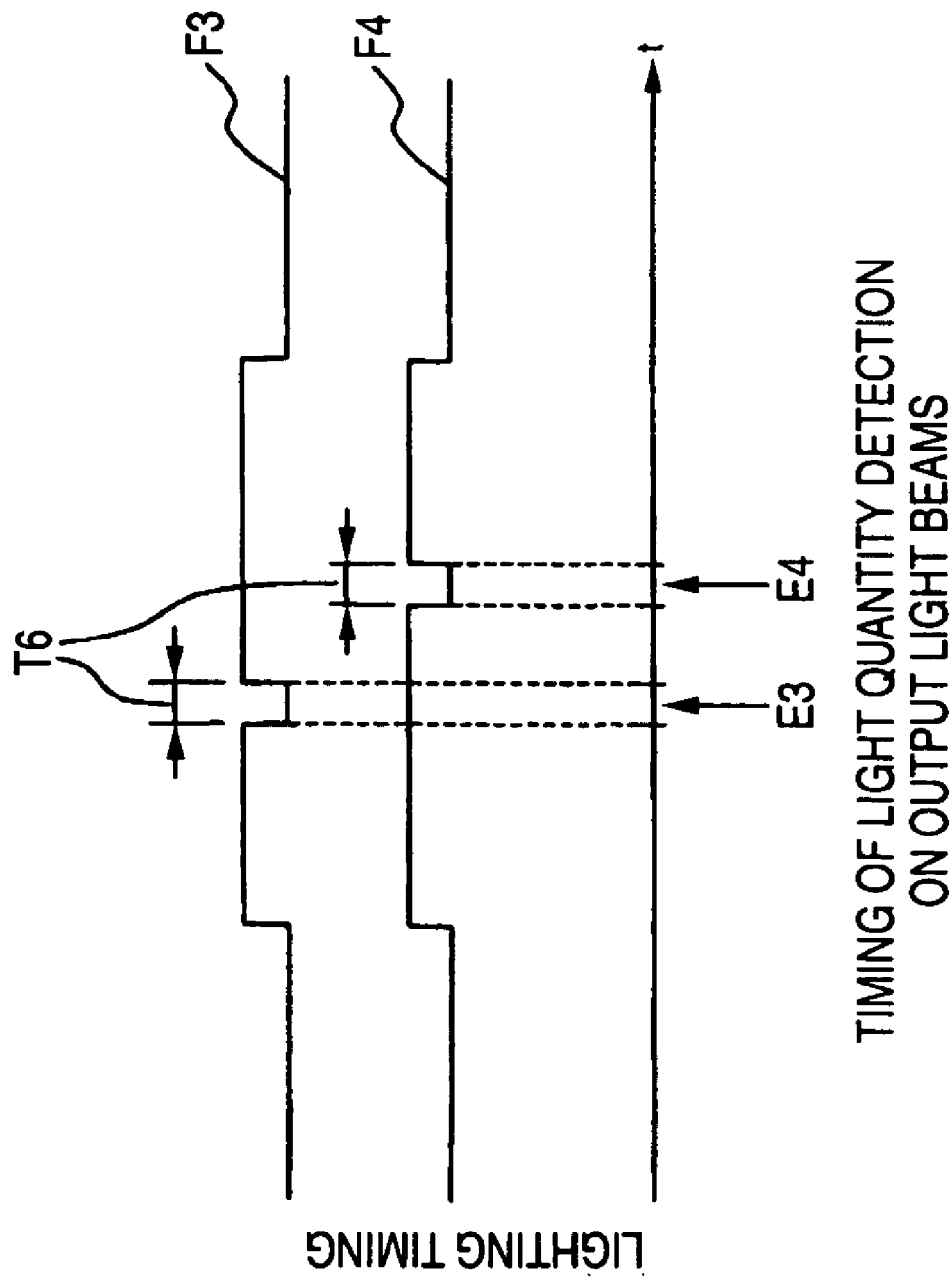
FIG. 15 is a diagram showing another example of lighting timing for the individual light guide plates of the backlight of FIG. 2.

FIG. 15 is a diagram showing another example of lighting timing for the individual light guide plates 13 and 14 of the backlight 8 of FIG. 2, and shows light quantity detection timing in the case where the point light sources 17 are turned on in such a manner that non-lighting periods in a lighting period are deviated from each other. In this exemplary lighting operation, light guide plates F3 and F4 start to be lit up at the same time and non-lighting periods T6 in the lighting period are deviated from each other by a prescribed time.

In this case, only one of the two light guide plates F3 and F4 is lit up during each non-lighting period T6. Therefore, light quantities of the respective light guide plates F3 and F4 can be detected by a single optical sensor by detecting light quantities of output light beams in this period (light quantity detection timing: E3 and E4). Combining this lighting operation with the lighting operation shown in any of FIGS. 10-12 makes it possible to detect light quantities without providing optical sensors for the respective light guide plates 13 and 14 even in the case where the plural light emission blocks 32 are lit up simultaneously.

Figure 16:
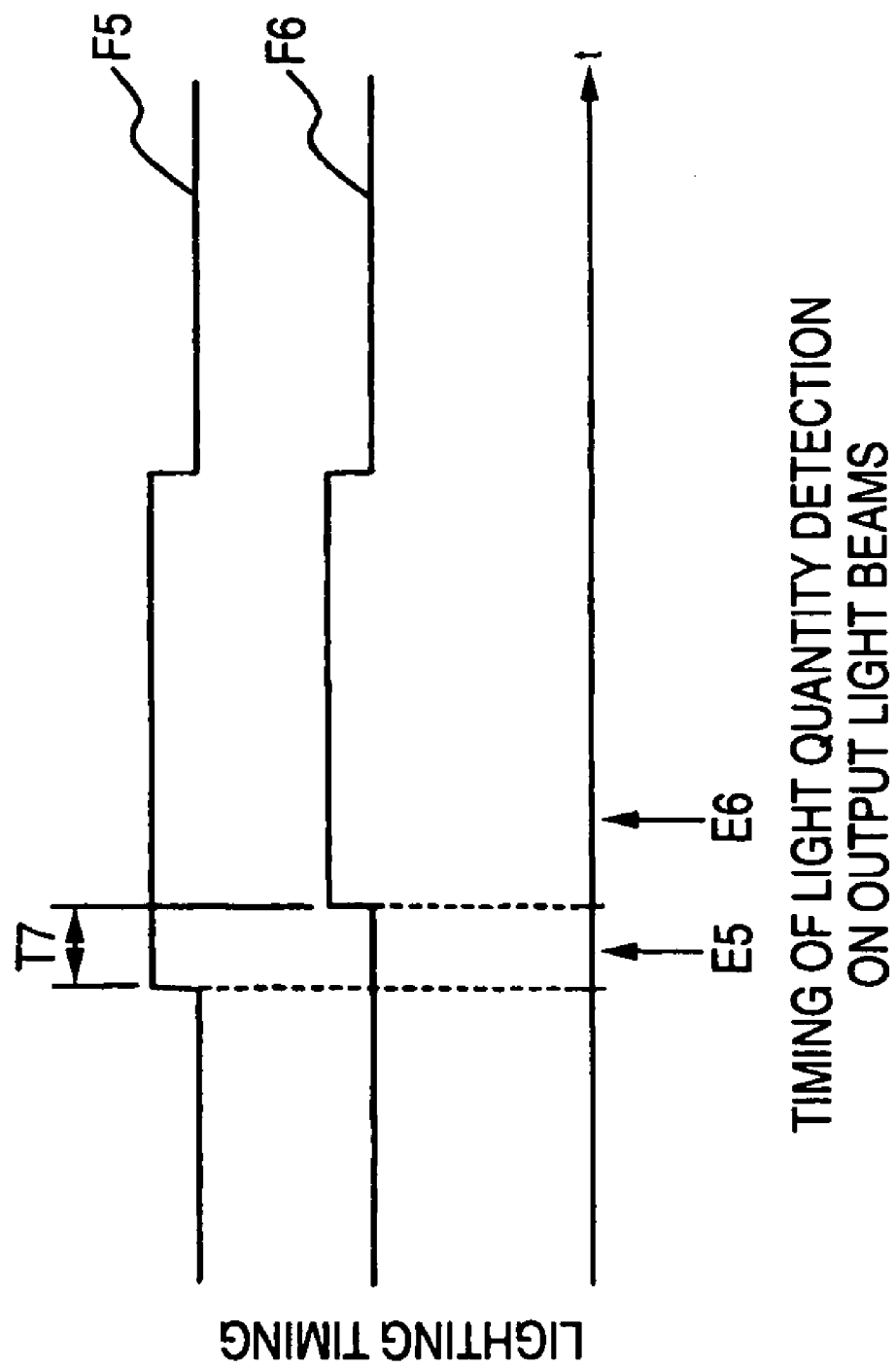
FIG. 16 is a diagram showing a further example of lighting timing for the individual light guide plates of the backlight of FIG. 2.

FIG. 16 is a diagram showing a further example of lighting timing for the individual light guide plates 13 and 14 of the backlight 8 of FIG. 2, and shows light quantity detection timing in the case where the light guide plates 13 and 14 start to be lit up at different time points. In this lighting operation, lighting of a light guide plate F6 is started after a lapse of a time T7 from a start of lighting of a light guide plate F5.

In this case, only one of the two light guide plates F5 and F6 is lit up during the period T7 from the start of lighting of the light guide plate F5 to the start of lighting of the light guide plate F6. Therefore, light quantities of the light guide plate F5 can be detected by detecting light quantities of output light beams in this period (light quantity detection timing: E5). Light quantities of the light guide plate F6 can be determined on the basis of differences between the light quantities detected in the above manner and light quantities (light quantity detection timing E6) that are detected while the two light guide plates F5 and F6 are lit up simultaneously.

Combining this lighting operation with the lighting operation shown in FIG. 10 or 12 makes it possible to detect light quantities without providing optical sensors for the respective light guide plates 13 and 14 even in the case where the plural light emission blocks 32 are lit up simultaneously.

Embodiment 2

Figure 17:
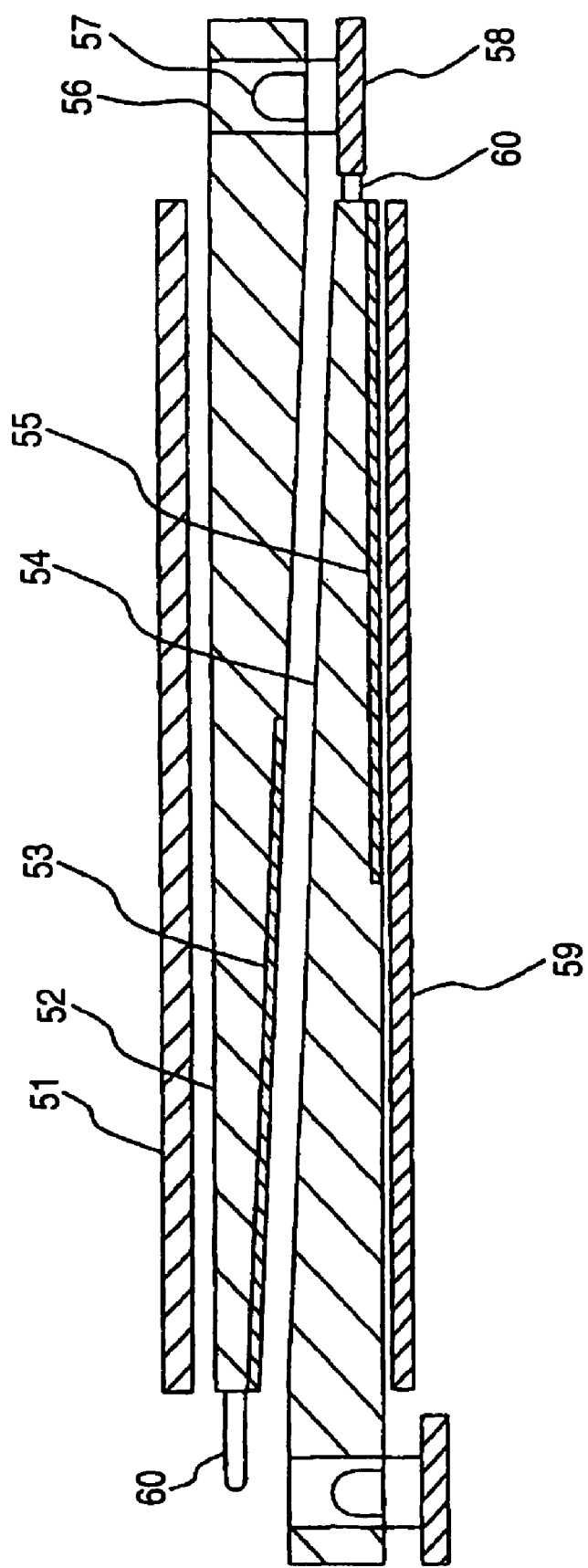
FIG. 17 is a sectional view showing the structure of an important part of an exemplary surface light source device according to a second embodiment of the invention.

FIG. 17 is a sectional view showing the structure of an important part of an exemplary surface light source device according to a second embodiment of the invention. The surface light source device according to this embodiment is different from the backlight 8 of FIG. 2 (first embodiment) in that each of the confronting surfaces of light guide plates 52 and 54 is inclined toward the side (of the other end) that is opposite to the side where point light sources 57 are disposed.

As for the front light guide plate 52, the back surface is inclined toward the side of the other end. That is, the other end surface of the light guide plate 52 is thinner than the one end surface where the point light sources 57 are disposed. As for the rear light guide plate 54, the front surface is inclined toward the side of the other end. That is, the other end surface of the light guide plate 54 is thinner than the one end surface where the point light sources 57 are disposed. The light guide plates 52 and 54 are disposed between an optical sheet 51 and a reflection sheet 59 in a wedge-like manner.

Diffusion patterns 53 and 55 are formed on the slant surface of the light guide plate 52 and the back surface of the light guide plate 54, respectively. The point light sources 57 are disposed inside respective engagement holes 56 that are formed in the light guide plates 52 and 54. The engagement holes 56 are formed in thicker-side end portions of the light guide plates 52 and 54.

According to this embodiment, the surface light source device can be made thinner because the light guide plates 52 and 54 can be located closer to each other.

Since each of the confronting surfaces of light guide plates 52 and 54 is inclined toward the side of the other end that is opposite to the side of the one end where the point light sources 57 are disposed, light that is input to the light guide plate 52 or 54 from each point light source 57 through the end surface can be output to the front side more effectively. That is, since the front or back surface is inclined, light that is input to the light guide plate 52 or 54 through its end surface is decreased in the incident angle as the light is reflected repeatedly by the front and back surfaces of the light guide plate 52 or 54. As a result, the light traveling through the light guide plate 52 or 54 can be output from the front surface without being subjected to total reflection. Therefore, the amount of light that is diffuse-reflected by the back-side diffusion patterns 53 and 55 can be reduced, which makes it possible to output the light effectively from the light exit area. That is, the efficiency of utilization of light that is radiated from each point light source 57 can be increased and hence a high-luminance surface light source device can be obtained.

Where the thickness of the surface light source device is maintained, the end surface of each of the light guide plates 52 and 54 on the side where the point light sources 57 are disposed can be made thicker, which increases the area of a portion of the incident surface on which light radiated from each point light source 57 is incident. Since light radiated from each point light source 57 is subjected to incidence on the incident surface effectively, a high-luminance surface light source device can be obtained.

Although the embodiment is directed to the case that the point light sources 57 are arranged along the shorter sideline of the light guide plate 52 or 54, the invention is not limited to such a case. For example, in a surface light source device in which the front or back surface of each light guide plate is inclined, plural point light sources having different emission colors may be arranged in the thickness direction of each light guide plate adjacent to its thicker-side end surface.

Figure 18:
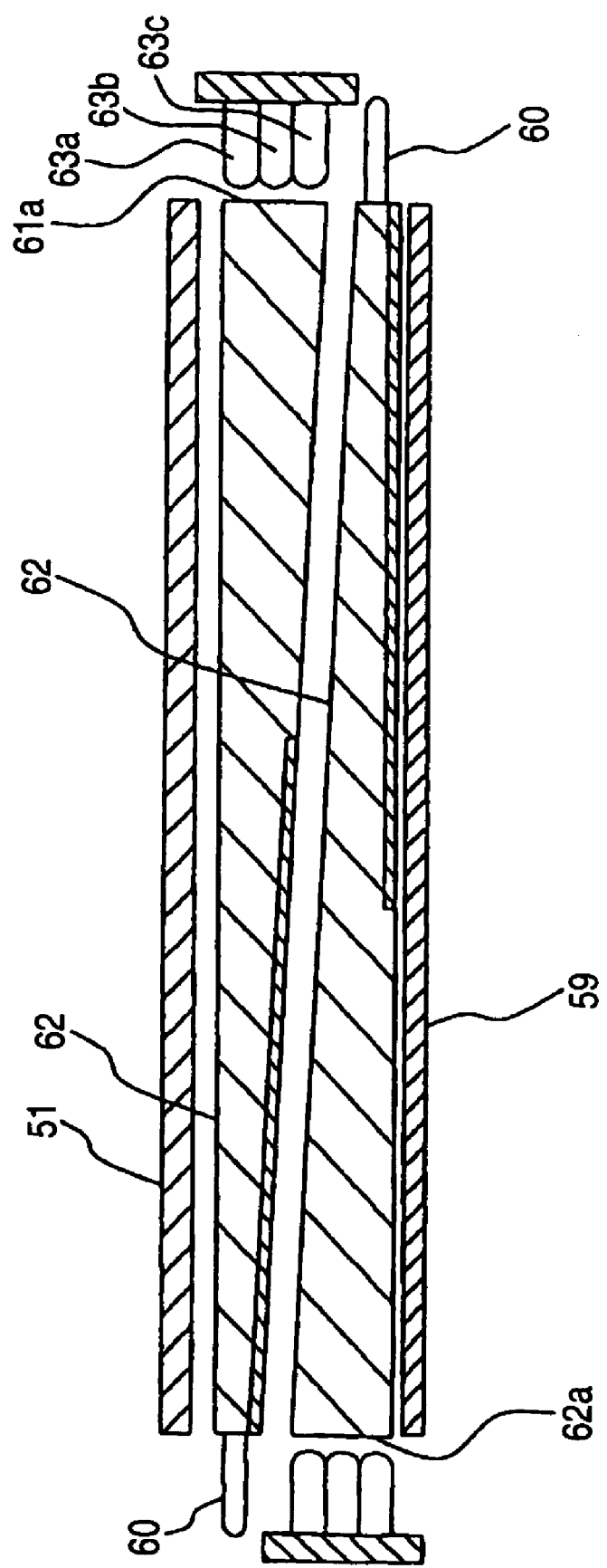
FIG. 18 is a sectional view showing the structure of an important part of another exemplary surface light source device according to the second embodiment of the invention.

FIG. 18 is a sectional view showing the structure of an important part of another exemplary surface light source device according to the second embodiment of the invention. In this surface light source device, three LEDs 63a-63c having different emission colors are arranged so as to be opposed to one end surface 61a or 62a of each of light guide plates 61 and 62. The LEDs 63a-63c project perpendicularly to the end surface of each light guide plate 61 or 62, and the LEDs of R, G, and B are arranged in the thickness direction of each light guide plate 61 or 62. That is, the three LEDs 63a-63c are provided for each light emission block 32.

With the above structure, where radiation light beams of the three LEDs 63a-63c having different emission colors are output from the light exit area after being mixed together, sufficient color mixing can be attained because the LEDs 63a-63c are arranged in the thickness direction of each light guide plate 61 or 62, that is, in the light exit direction. This makes it possible to suppress occurrence of color unevenness in exit light. Therefore, a surface light source device that is superior in color mixing performance can be obtained.

Embodiment 3

The first and second embodiments are directed to the case that the diffusion pattern is formed on each of the light guide plates arranged in the front-rear direction on the side of the other end that is opposite to the side where the point light sources are disposed, whereby light that is input from each point light source to the associated light guide plate is output from it after being diffused sufficiently. In contrast, in this embodiment, light guide plates for diffusion are disposed behind a light guide plate for emission.

Figure 19:
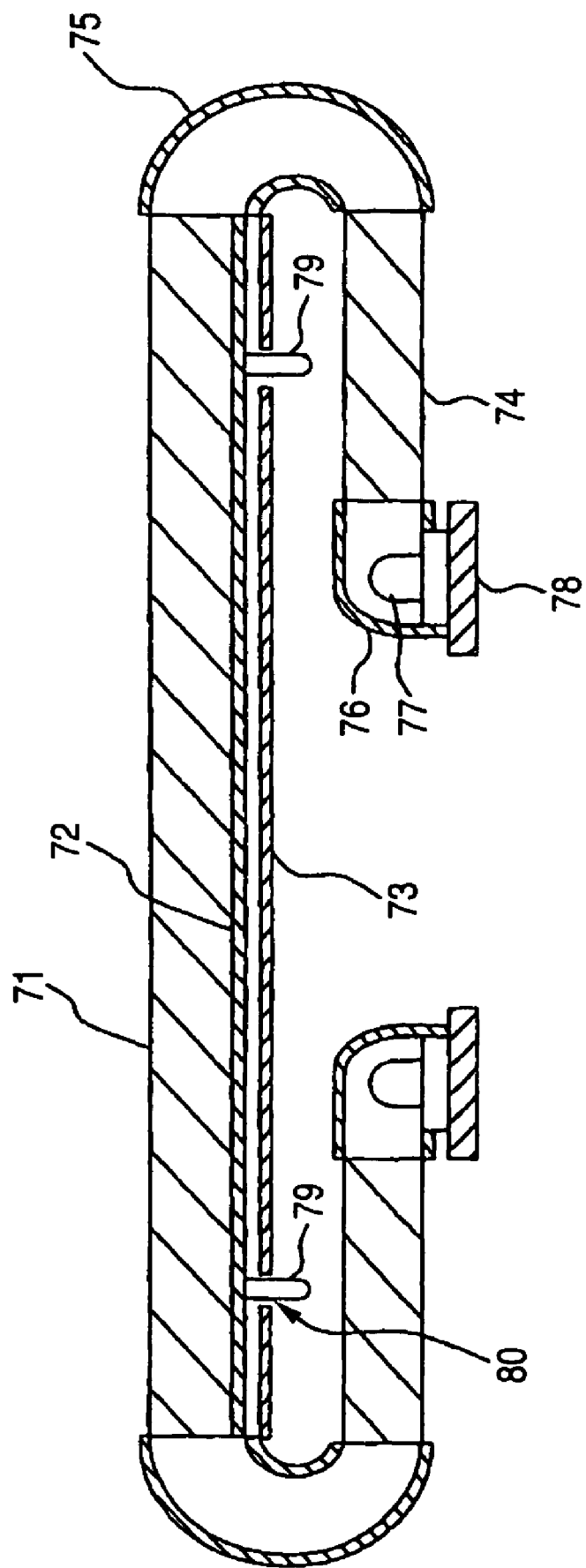
FIG. 19 is a sectional view showing the structure of an important part of an exemplary surface light source device according to a third embodiment of the invention.

FIG. 19 is a sectional view showing the structure of an important part of an exemplary surface light source device according to a third embodiment of the invention. The surface light source device according to this embodiment is composed of a light guide plate 71 for light emission that is disposed on the front side, two light guide plates 74 for light diffusion that are disposed on the rear side, side reflectors 75 that are disposed on both sides of the light guide plate 71, and two light source units 78 that are disposed behind the light guide plate 71.

The entire back surface of the light guide plate 71 for light emission is formed with a diffusion pattern 72. The length of each light guide plate 74 for light diffusion is shorter than ½ of the length of the light guide plate 71 in the direction perpendicular to the arrangement direction of point light sources 77, that is, in the direction parallel with the longer sidelines of the light guide plate 71. Each of the light guide plates 71 and 74 is sectioned into plural light emission blocks by side reflection plates.

Each light source unit 78 is composed of the plural point light sources 77 that are arranged so as to be directed to the front side and a light source reflector 76 for reflecting light coming from the point light sources 77. Each light source unit 78 is disposed along one, inside end surface of the associated light guide plate 74.

Each side reflector 75 is a reflection member for optically coupling the other end surface of the associated light guide plate 74 to the corresponding end surface of the light guide plate 71, and is a silver-evaporated metal plate, for example. To reduce the sideways projection length, each side reflector 75 has an elliptical sectional shape. More specifically, each side reflector 75 is composed of a first reflection member that is disposed outside and a second reflection member that is disposed inside. The first reflection member connects the front surface of the light guide plate 71 and the back surface of the associated light guide 74. The second reflection member connects the back surface of the light guide plate 71 and the front surface of the associated light guide 74.

Light that is input from each point light source 77 to the associated light guide plate 74 through its one end surface travels through the light guide plate 74 and then is subjected to incidence on the end surface of the light guide plate 71 via the side reflector 75. This input light travels through the light guide plate 71, is diffuse-reflected by the diffusion pattern 72, and is output from the light exit area (front surface) of the light guide plate 71. Since light that is input from each point light source 77 to the associated light guide plate 74 travels through the light guide plate 74, it has been diffused sufficiently when it is output from the light guide plate 74. This improves the color mixing performance and prevents luminance unevenness and color unevenness from occurring in the arrangement direction of the point light sources 77.

Optical fibers 79 for detecting light quantities of respective light emission blocks are inserted in plural through-holes 80 that are formed through the reflection sheet 73 which is disposed behind the light guide plate 71. Through-holes 80 are formed for the respective light emission blocks along the arrangement direction of the point light sources 77 on each of the two sides of the light guide plate 71. Of the optical fibers 79 disposed on both sides of the light guide plate 71, the right-hand optical fiber 79 serves for light quantity detection for the right-hand light source unit 78 and the left-hand optical fiber 79 serves for light quantity detection for the left-hand light source unit 78.

Figure 20:
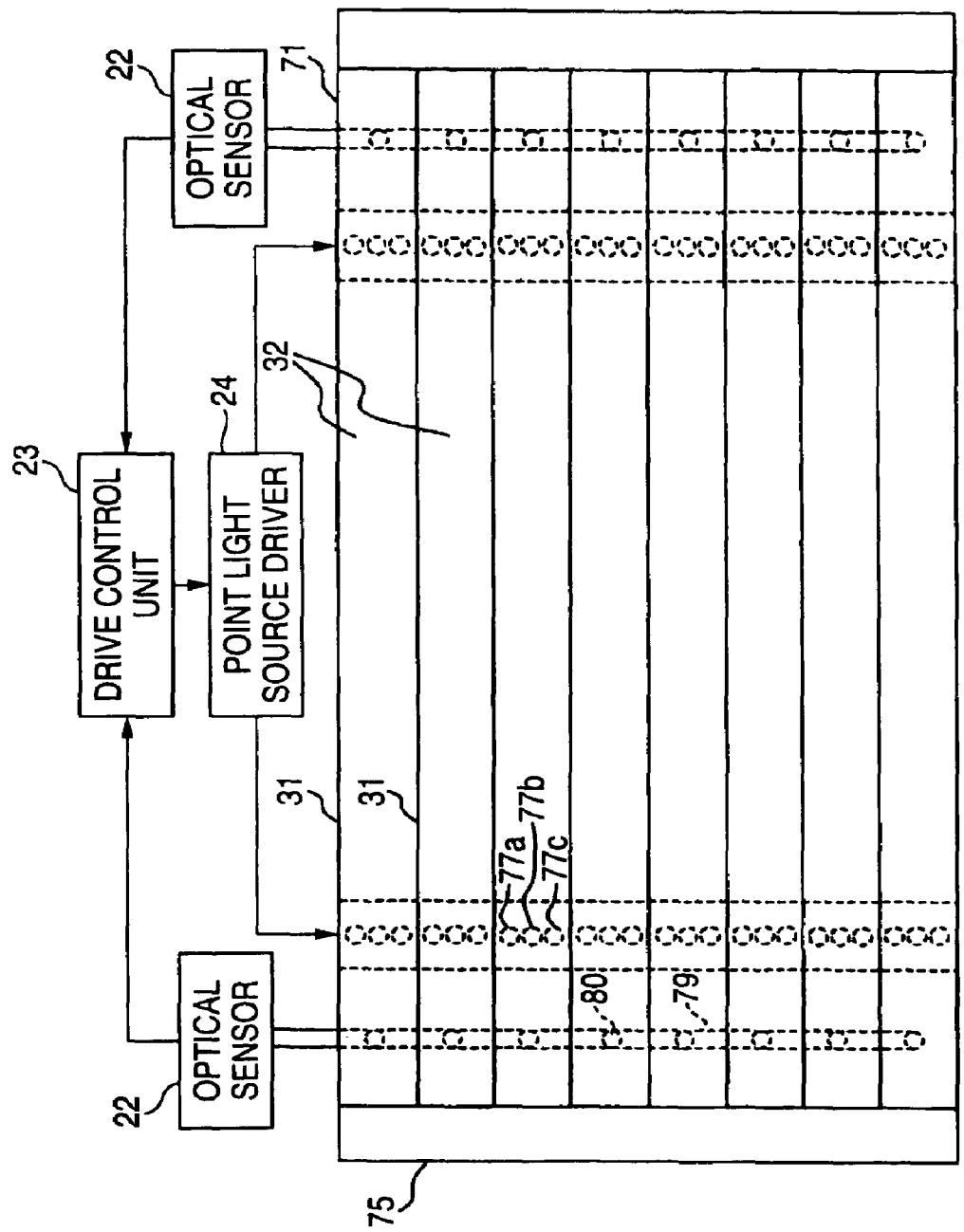
FIG. 20 is a plan view showing the details (example) of an important part of the surface light source device of FIG. 19.

FIG. 20 is a plan view showing the details (example) of an important part of the surface light source device of FIG. 19, and shows the light guide plate 71 whose light exit area is sectioned into plural light emission blocks 32 and the optical fibers 79 for transmitting output light beams of the respective light emission blocks 32 to optical sensors 22.

According to this embodiment, the color mixing performance can be improved and good display quality can be obtained because light beams emitted from the point light sources 77 are mixed together sufficiently by the light guide plates 74 for light diffusion. Since the color mixing performance is improved, the pitch of the point light sources 77 in their arrangement direction can be increased and hence a high-luminance surface light source device can be realized by a smaller number of point light sources 77.

The embodiment is directed to the case that the two light guide plates 74 for light diffusion are provided behind the light guide plate 71 for light emission and the light source units 78 are disposed adjacent to the respective light guide plates 74. However, the invention is not limited to such a case. For example, a structure is possible that a single light source unit is disposed at a position corresponding to the center of a light guide plate for emission and light beams radiated from the light source unit are input to light guide plates for diffusion.

Figure 21:
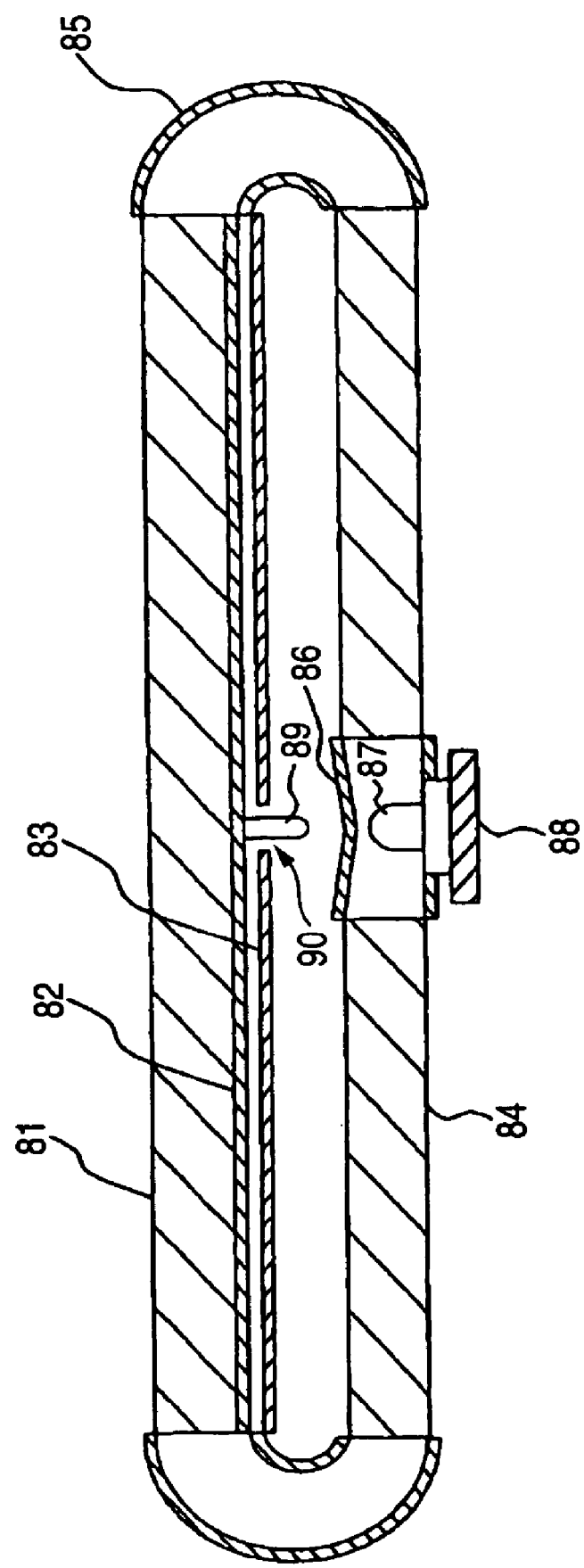
FIG. 21 is a sectional view showing the structure of an important part of another exemplary surface light source device according to the third embodiment of the invention.

FIG. 21 is a sectional view showing the structure of an important part of another exemplary surface light source device according to the third embodiment of the invention. In this exemplary structure, a light source unit 88 is disposed behind a light guide plate 81 for light emission at a position corresponding to the center of the light source unit 88 and radiated light beams are subjected to incidence on the end surfaces of two light guide plates 84 for light diffusion.

An optical fiber 89 for detecting light quantities of respective light emission blocks is inserted in plural through-holes 90 that are formed through a reflection sheet 83 that is disposed behind the light guide plate 81. The through-holes 90 are formed for the respective light emission blocks at a position corresponding to the center of the light guide plate 81 along the arrangement direction of point light sources 87. A light source reflector 86 for reflecting light beams coming from the point light sources 87 toward the end surfaces of the light guide plates 84 has a sectional shape that it is dented toward the back side so as to be symmetrical with respect to the center.

With the above structure, light beams radiated from the single light source unit 88 can be output effectively from the light exit surface of the light guide plate 81 after diffusing them sufficiently, which makes it possible to increase the efficiency of utilization of light. Therefore, a high-luminance surface light source device can be obtained by using smaller numbers of point light sources 87 and optical sensors.

Embodiment 4

The first to third embodiments are directed to the case that light beams originating from the point light sources are output from the light exit area by using the light guide plates. In contrast, in this embodiment, light beams originating from point light sources are output from a light exit area by reflecting light traveling through a hollow space by a reflection member.

Figure 22:
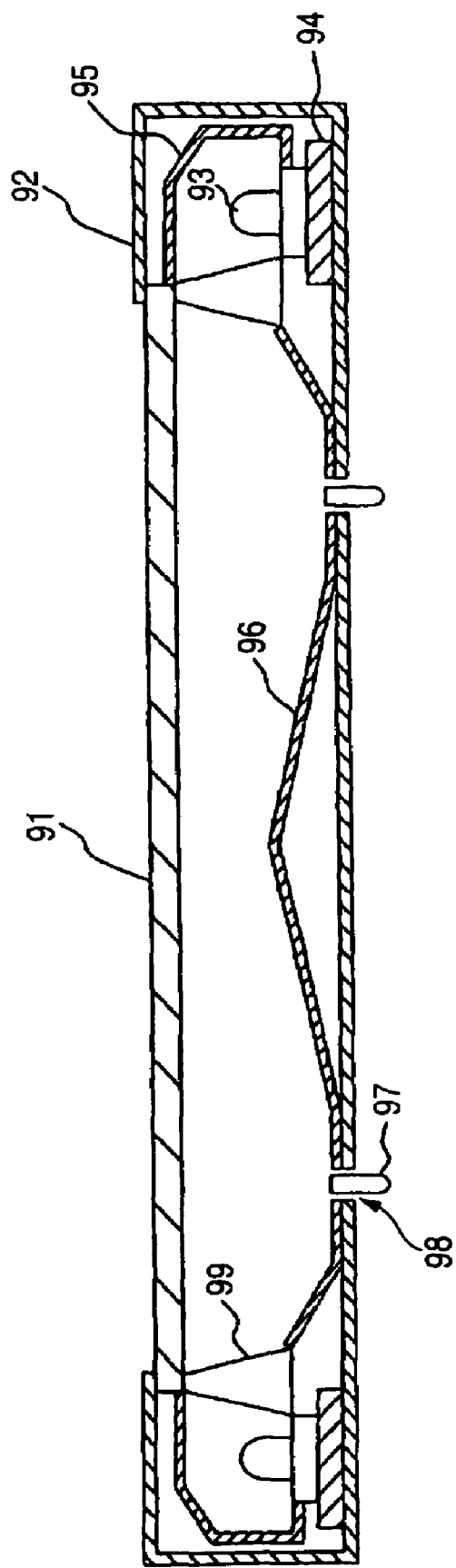
FIG. 22 is a sectional view showing the structure of an exemplary surface light source device according to a fourth embodiment of the invention.

FIG. 22 is a sectional view showing the structure of an exemplary surface light source device according to a fourth embodiment of the invention. The surface light source device according to this embodiment is composed of a diffusion plate 91, a body 92, two light source units 94 that are disposed on both sides of the diffusion plate 91, and a reflection plate 96. The body 92 has, on the front side, an opening to serve as a light exit area, and the diffusion plate 92 is disposed in the opening. Each light source unit 94 is composed of plural point light sources 93, a reflector 95, and a deflection element 99, and is housed in the body 92.

The diffusion plate 91 is formed by mixing a fine reflection material into a transparent, flat-plate-like member made of a synthetic resin or glass or roughening the surface of such a member. A hollow space that is formed behind the diffusion plate 91 is sectioned into plural light emission blocks by light reflection members. The reflection plate 96 is opposed to the diffusion plate 91 with the hollow space interposed in between, and serves to reflect light traveling through the follow space to the front side. A central portion of the reflection plate 96 projects toward the front side. The luminance profile of exit light in the direction perpendicular to the arrangement direction of the point light sources 93 can be optimized by adjusting the shape of the reflection plate 96.

The deflection element 99 is an optical element for refracting light coming from each point light source 93 to the back side. In particular, the deflection element 99 refracts, to the back side, that is, to the reflection plate 96, part, having such an incident angle as to give a maximum luminance value, of light incident on its incident surface. Such a deflection element 99 is a transparent prism-shaped member made of glass or an organic resin such as an acrylic resin or a polycarbonate resin. The deflection element 99 is disposed along the hollow space, that is, parallel with the arrangement direction of the point light sources 93.

Light radiated from each point light source 93 which is subjected to incidence on the incident surface of the deflection element 99 directly or after being reflected by the reflector 95. The incident light is input to the hollow space after being refracted toward the reflection plate 96. The use of the deflection element 99 makes it possible to prevent light emitted from each point light source 93 from being output from a region close to the point light source 93 in the light exit area (front surface) of the diffusion plate 91 because the deflection element 99 refracts the light to the back side. This makes it possible to prevent luminance unevenness and color unevenness from occurring in the arrangement direction of the point light sources 93.

Optical fibers 97 for detecting light quantities of the respective light emission blocks are inserted in plural through-holes 98 that are formed through the body 92 and the reflection plate 96. Through-holes 98 are formed for the respective light emission blocks along the arrangement direction of the point light sources 93 on each of the two sides of the body 92. Of the optical fibers 97 disposed on both sides of the body 92, the right-hand optical fiber 97 serves for light quantity detection for the right-hand light source unit 94 and the left-hand optical fiber 97 serves for light quantity detection for the left-hand light source unit 94.

Figure 23:
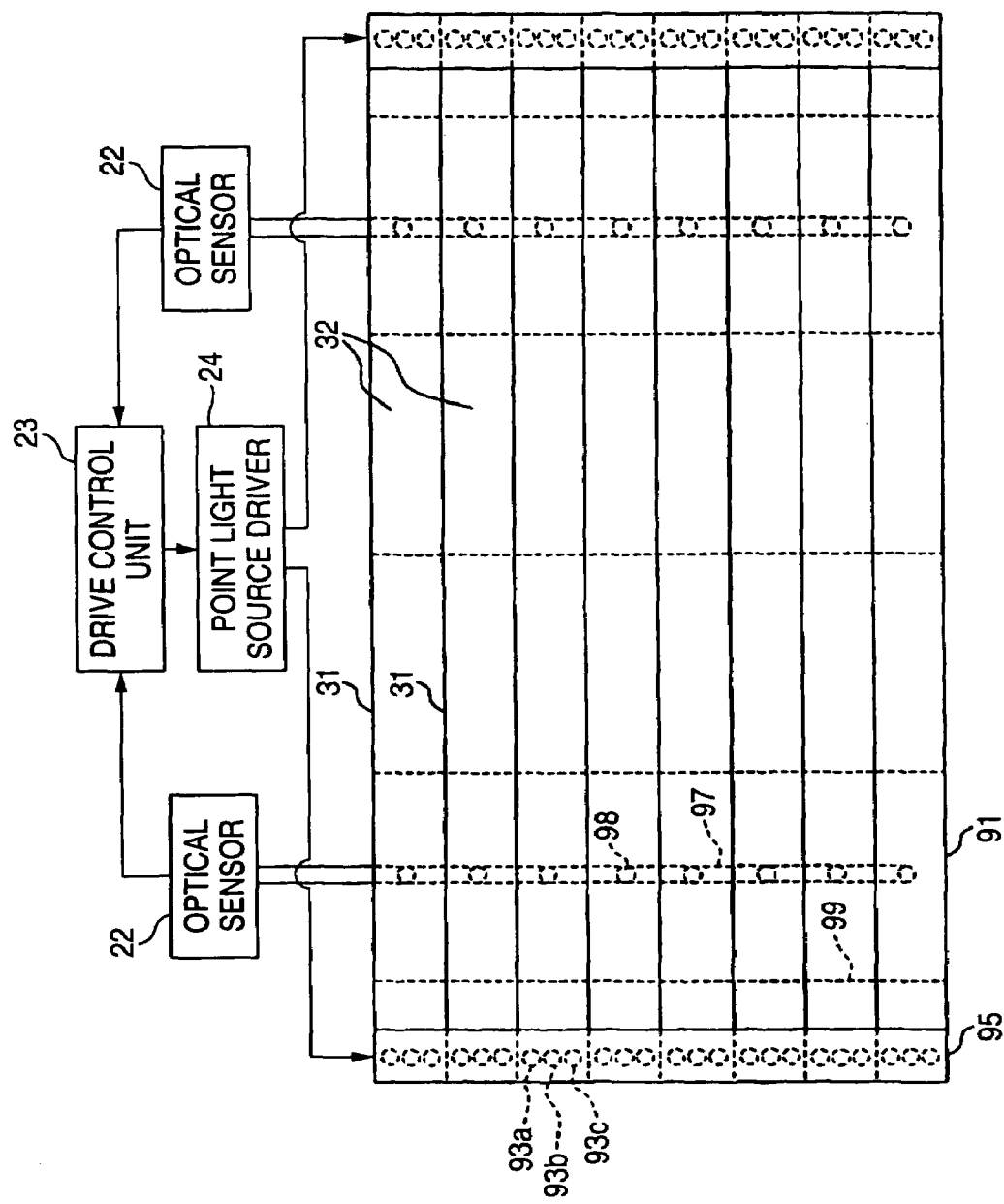
FIG. 23 is a plan view showing the details (example) of an important part of the surface light source device of FIG. 22.

FIG. 23 is a plan view showing the details (example) of an important part of the surface light source device of FIG. 22, and shows the hollow space whose light exit area is sectioned into plural light emission blocks 32 and the optical fibers 97 for transmitting output light beams of the respective light emission blocks 32 to optical sensors 22.

According to this embodiment, a phenomenon that input light is directly output from regions of the light exit area that are close to the point light sources 93 can be prevented effectively because light to be input to the hollow space from the point light sources 93 is refracted to the reflection plate 96 by the deflecting element 99. Since input light is output after being diffused sufficiently in the hollow space, luminance unevenness and color unevenness can be prevented from occurring in the arrangement direction of the point light sources 93.

Embodiment 5

The first to fourth embodiments are directed to the case that the point light sources are arranged in the direction perpendicular to the gate lines 5 of the liquid crystal panel 2, that is, along the shorter sidelines of the light exit area, and the light exit area is sectioned by the reflection members. In contrast, in this embodiment, point light sources are arranged in the direction parallel with the gate lines 5, that is, along the long side of a light exit area, and the light exit area is sectioned by diffusion patterns that are formed for respective, plural light guide plates.

Figure 24:
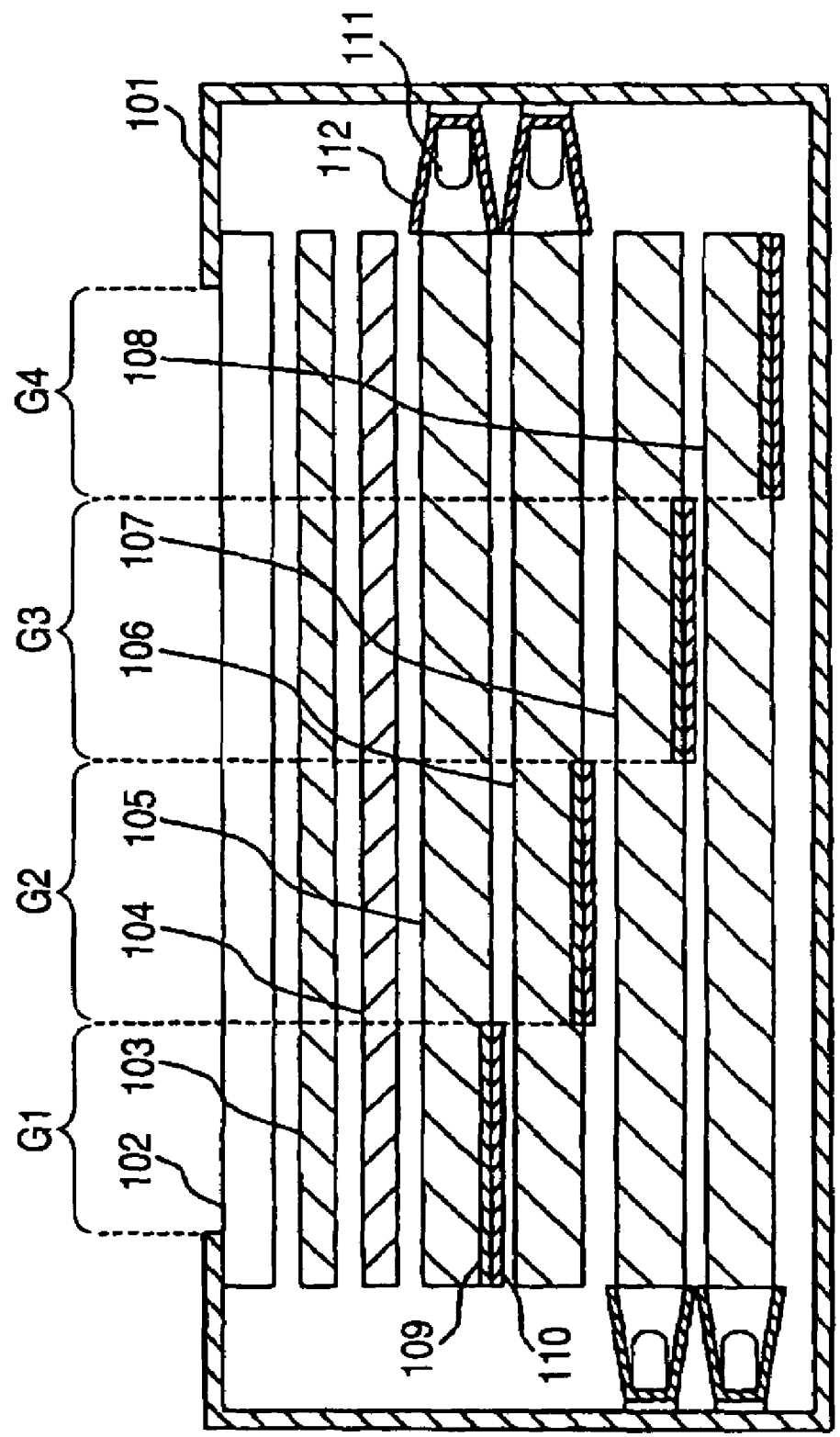
FIG. 24 is a sectional view showing the configuration of an exemplary liquid crystal display device according to a fifth embodiment of the invention.

FIG. 24 is a sectional view showing the configuration of an exemplary liquid crystal display device according to a fifth embodiment of the invention. In the liquid crystal display device according to this embodiment, a liquid crystal panel 102 and a backlight for illuminating the liquid crystal panel 102 from the back side are formed integrally in a body 101. The body 101 has an opening on the front side and the liquid crystal panel 102 is disposed in such a manner that the opening is serves as a display area. An optical sheet 103, a diffusion sheet 104, and four light guide plates 105-108 are disposed in this order behind the liquid crystal panel 102.

In this example, the light exit area is sectioned into four light emission blocks G1-G4 and the light guide plates 105-108 are disposed for the respective light emission blocks G1-G4. The light emission blocks G1-G4 are formed in a band-like manner so as to extend in the arrangement direction of point light sources 111, that is, along the gate lines 5. Diffusion patterns 109 are formed on the back surfaces of the light guide plates 105-108 so as to correspond to the light emission blocks G1-G4, respectively. Reflection sheets 110 are disposed behind the light guide plates 105-108 so as to correspond to the diffusion patterns 109, respectively.

Plural point light sources 111 are opposed to one end surface of each of the light guide plates 105-108, and light beams radiated from the respective point light sources 111 which are subjected to incidence on the end surface directly or after being reflected by a reflector 112. Each diffusion pattern 109 is formed on the side (of the other end), opposite to the side where the point light sources 111 are disposed, of the associated one of the light guide plates 105-108. In particular, each diffusion pattern 109 is formed at a position that is closer to the other end of the associated light guide plate than its center is in the direction perpendicular to the arrangement direction of the point light sources 111.

For example, the diffusion patterns 109 corresponding to the respective light emission blocks G1-G4 are formed in the order starting from the front light guide plate 105. More specifically, point light sources 111 are disposed on the right of the light guide plates 105 and 106, and the other point light sources 111 are disposed on the left of the light guide plates 107 and 108. The light emission block G1 is lit up by the diffusion pattern 109 that is formed on the light guide plate 105, and the light emission block G2 is lit up by the diffusion pattern 109 that is formed on the light guide plate 106. The light emission block G3 is lit up by the diffusion pattern 109 that is formed on the light guide plate 107, and the light emission block G4 is lit up by the diffusion pattern 109 that is formed on the light guide plate 108.

Since the diffusion patterns 109 are formed on the side, opposite to the side where the point light sources 111 are disposed, of the respective light guide plates 105-108, long distances can be secured between the point light sources 111 and the diffusion patterns 109. Therefore, light that is input from each point light source 111 to the associated light guide plate is output after being diffused sufficiently in the arrangement direction of the point light sources 111, which makes it possible to prevent luminance unevenness and color unevenness from occurring in the light exit area in the arrangement direction of the point light sources 111.

Figure 25:
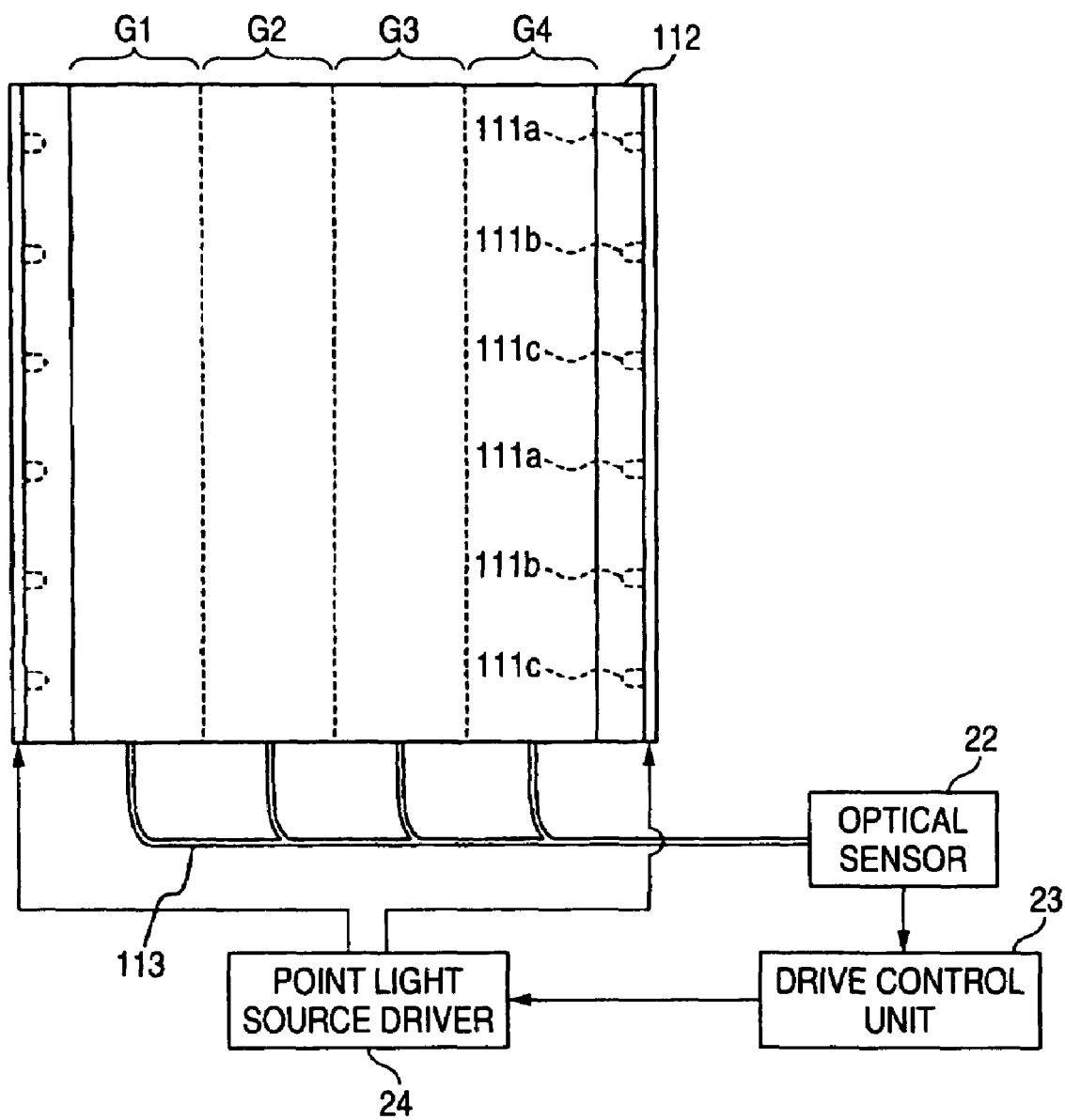
FIG. 25 is a plan view showing the details (example) of an important part of the liquid crystal display device of FIG. 24.

FIG. 25 is a plan view showing the details (example) of an important part of the liquid crystal display device of FIG. 24, and shows the light exit area that is sectioned into the four light emission blocks G1-G4 and an optical fiber 113 for transmitting output light beams of the respective light emission blocks G1-G4 to an optical sensor 22. LEDs 111a-111c of R, G, and B are arranged along the longer sidelines of the light exit area. Light beams that are input from the point light sources 111 to the light guide plates 105-108 and then output therefrom are transmitted by the optical fiber 113 that is disposed adjacent to the side surfaces of the light guide plates 105-108.

The optical fiber 113 collects output light beams of the respective light emission blocks G1-G4, that is, the respective light guide plates 105-108, and outputs resulting light to the optical sensor 22. The light transmitting means shown in any of FIGS. 6-8 may be used instead of the optical fiber 113.

The point light sources 111 are driven by a drive control unit 23 in such a manner that lighting periods when only one light emission block is lit up are set. Therefore, light quantities of the respective light emission blocks G1-G4 can be detected by the single optical sensor 22; that is, it is not necessary to provide optical sensors for the respective light emission blocks G1-G4.

In this embodiment, the diffusion patterns 109 are formed on the side of the other end that is opposite to the side of the one end where the point light sources 111 are disposed. Therefore, a phenomenon that light that is input from each point light source 111 to the associated light guide plate through its end surface is output from a region close to the point light source 111 without being diffused can be prevented. Since input light beams are output after being diffused sufficiently in the light guide plate, luminance unevenness and color unevenness can be prevented from occurring in the arrangement direction of the point light sources 111 in a region of the light exit area that is close to the point light sources 111. Further, the color mixing performance can be improved without widening the frame area of the liquid crystal display device.

Although the embodiment is directed to the case that the optical fiber 113 is disposed adjacent to the side surfaces of the light guide plates 105-108, the invention is not limited to such a case. For example, optical fibers 113 and optical sensors 22 may be disposed adjacent to the end surfaces of the light guide plates 105-108 that are located on the side (of the other ends) opposite to the side where the point light sources 111 are disposed.

Figure 26:
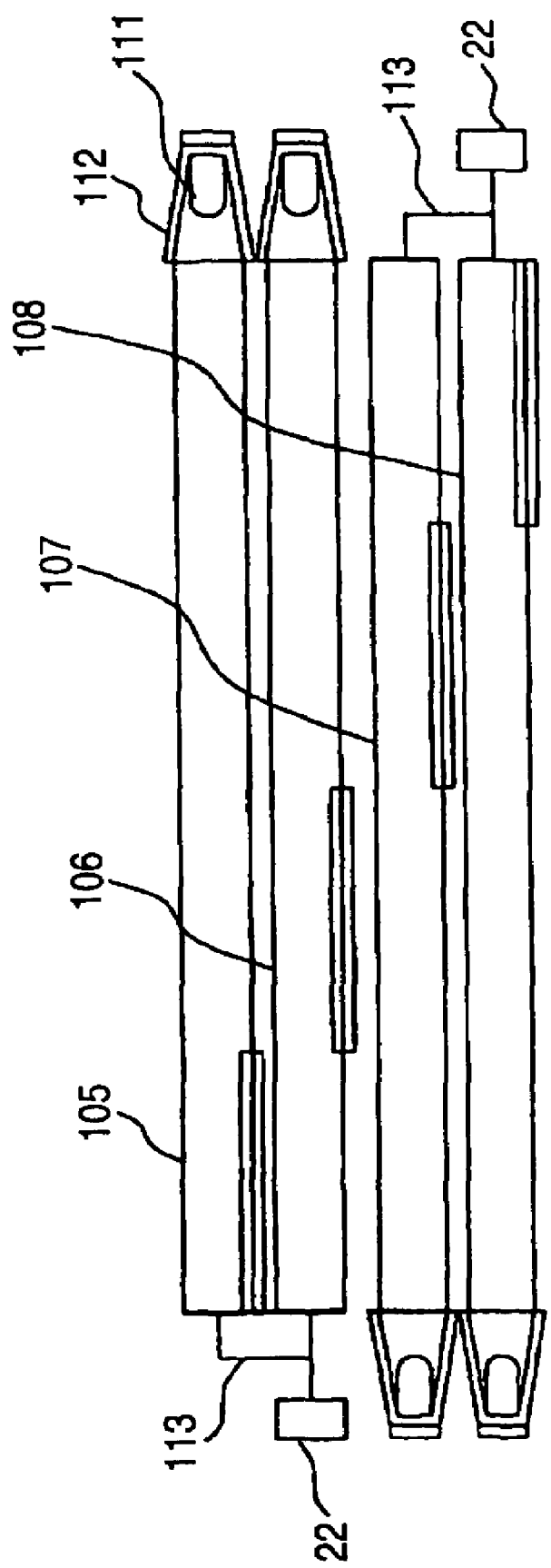
FIG. 26 is a side view showing another exemplary structure of an important part of the liquid crystal display device of FIG. 24.

FIG. 26 is a side view showing another exemplary structure of an important part of the liquid crystal display device of FIG. 24, and shows optical fibers 113 and optical sensors 22 that are disposed adjacent to the end surfaces of the light guide plates 105-108. The optical fibers 113 and the optical sensors 22 are disposed adjacent to the end surfaces of the light guide plates 105-108 that are located on the side (of the other ends) opposite to the side where the point light sources 111 are disposed. That is, the optical fibers 113 and the optical sensors 22 are disposed on the left side of the light guide plates 105 and 106 and on the right side of the light guide plates 107 and 108.

With the above configuration, in the body 101, the optical sensors 22 can be disposed in the spaces that are formed because of the arrangement of the arrays of point light sources 111. This makes it possible to narrow the frame area.

Although the embodiment is directed to the case that the light emission blocks G1-G4 are assigned in the order starting from the front light guide plate 105, the invention is not limited to such a case. For example, light guide plates on which diffusion patterns are formed at positions closer to the center, respectively, may be disposed on the front side.

Figure 27:
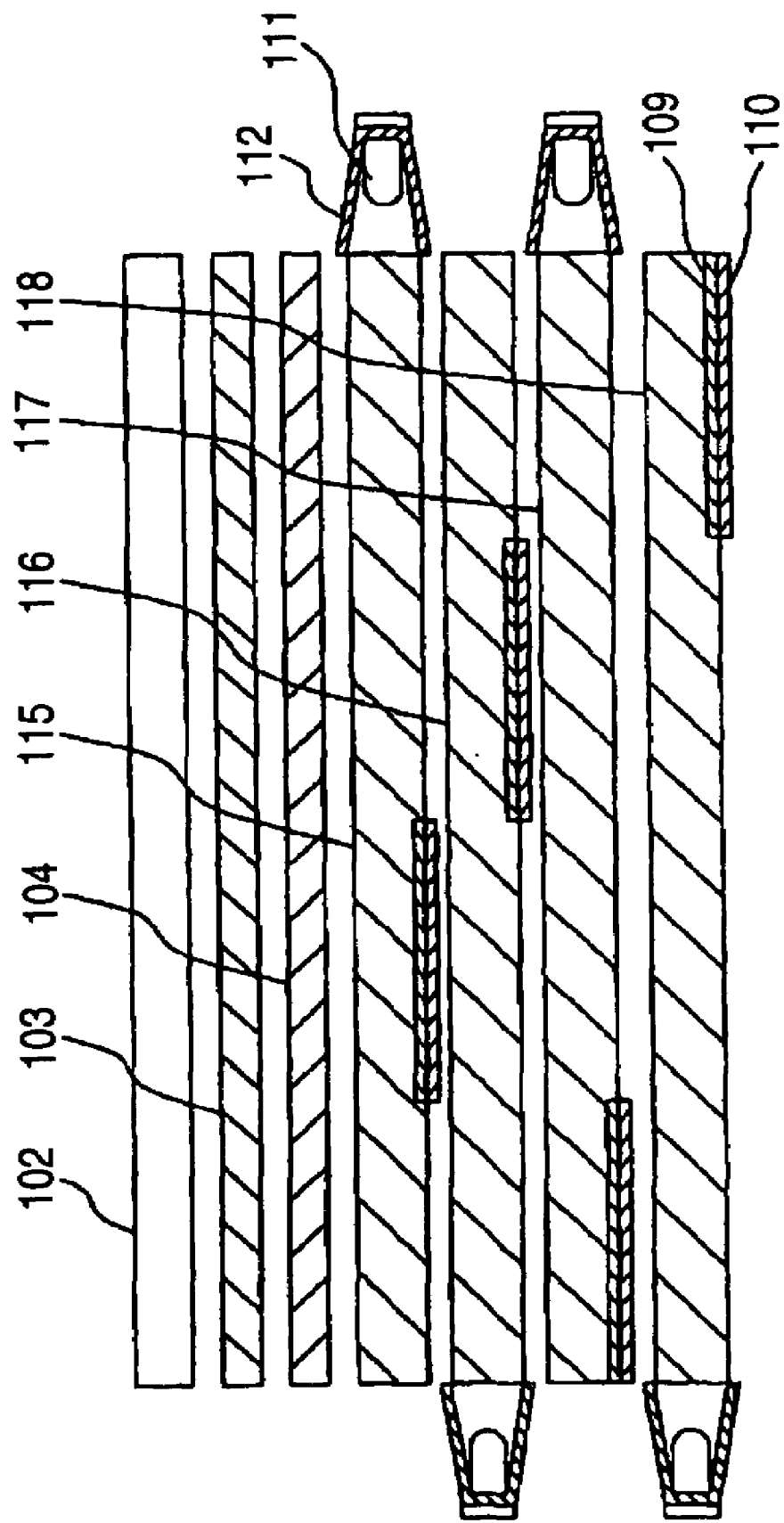
FIG. 27 is a sectional view showing the structure of an important part of another exemplary liquid crystal display device according to the fifth embodiment of the invention.

FIG. 27 is a sectional view showing the structure of an important part of another exemplary liquid crystal display device according to the fifth embodiment of the invention. In this exemplary structure, light guide plates 115 and 116 on which diffusion patterns 109 are formed at positions closer to the center, respectively, are disposed on the front side.

More specifically, the light guide plate 115 on which the diffusion pattern 109 corresponding to a light emission block G2 is formed is made the most front light guide plate, and the light guide plate 116 on which the diffusion pattern 109 corresponding to a light emission block G3 is disposed behind the light guide plate 115. A light guide plate 117 on which the diffusion pattern 109 corresponding to a light emission block G1 is disposed behind the light guide plate 116, and a light guide plate 117 on which the diffusion pattern 109 corresponding to a light emission block G4 is made the rearmost light guide plate. Arrays of point light sources 111 are disposed alternately on the right of and on the left of the light guide plates 115-118.

With the above structure, the light guide plates 115 and 116 for illuminating a central portion of the display area of the liquid crystal panel 2 are disposed closer to the front side than the light guide plates 117 and 118 for illuminating peripheral portions of the display area. Therefore, the luminance of the central portion of the display area can be set high and a proper luminance distribution can be obtained. Further, since the arrays of point light sources 111 are disposed alternately on the right of and on the left of the light guide plates 115-118, spaces are formed between the arrays of point light sources 111 in the stacking direction of the light guide plates 115-118. This enables effective dissipation of heat that is generated in association with light emission.

Although the embodiment is directed to the case that the point light sources 111 are opposed to the light guide plates 115-118, the invention is not limited to such a case. For example, point light sources may be inserted in respective engagement holes that are formed in the light guide plates 115-118.

Figure 28:
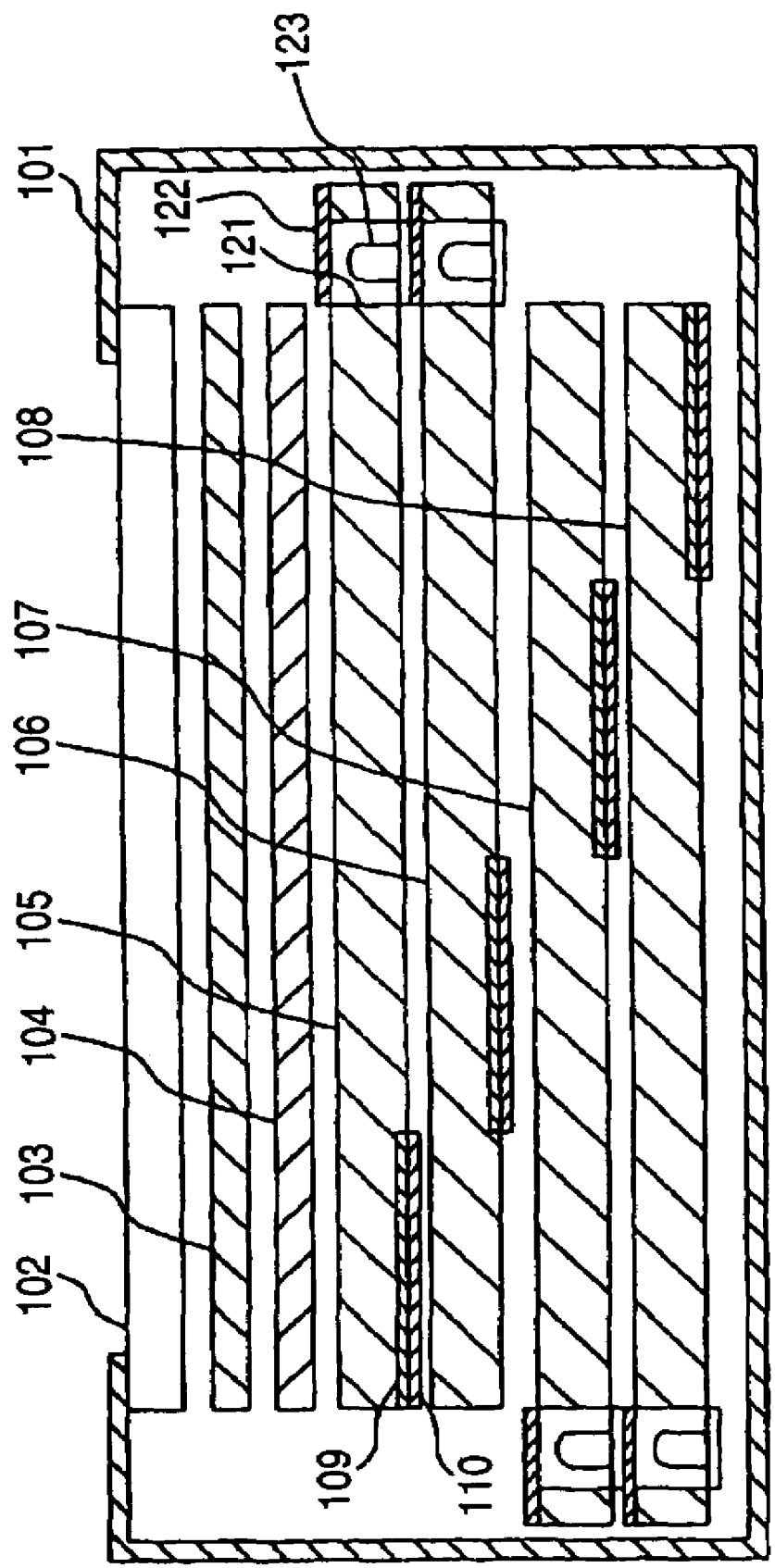
FIG. 28 is a sectional view showing the structure of an important part of still another exemplary liquid crystal display device according to the fifth embodiment of the invention.

FIG. 28 is a sectional view showing the structure of an important part of still another exemplary liquid crystal display device according to the fifth embodiment of the invention. In this exemplary structure, point light sources 123 are inserted in respective engagement holes 121 that are formed in the light guide plates 105-108 in their thickness directions.

No particular limitations are imposed on the shape of the engagement holes 121: they may assume a circular shape, a rectangular shape, a hexagonal shape, or the like. Each engagement hole 121 may either penetrate through the light guide plate 105, 106, 107, or 108 or have only a single opening. The inside surface of each engagement hole 121 is subjected to smoothing processing for lowering the degree of asperity such as mirror-finishing. The inside surface is perpendicular to the front surface and the back surface of the light guide plate 105, 106, 107, or 108. The engagement holes 121 are formed for the respective point light sources 123. Inserting the point light sources 123 in the engagement holes 121 allows light radiated from the point light sources 123 to be input effectively to the light guide plates 105-108.

Although the embodiment is directed to the case that the diffusion patterns are formed on the back surfaces of the light guide plates, respectively, the invention is not limited to such a case. For example, a structure is possible that end surfaces of respective light guide plates are inclined and diffusion patterns are formed on the respective slant surfaces.

Figure 29:
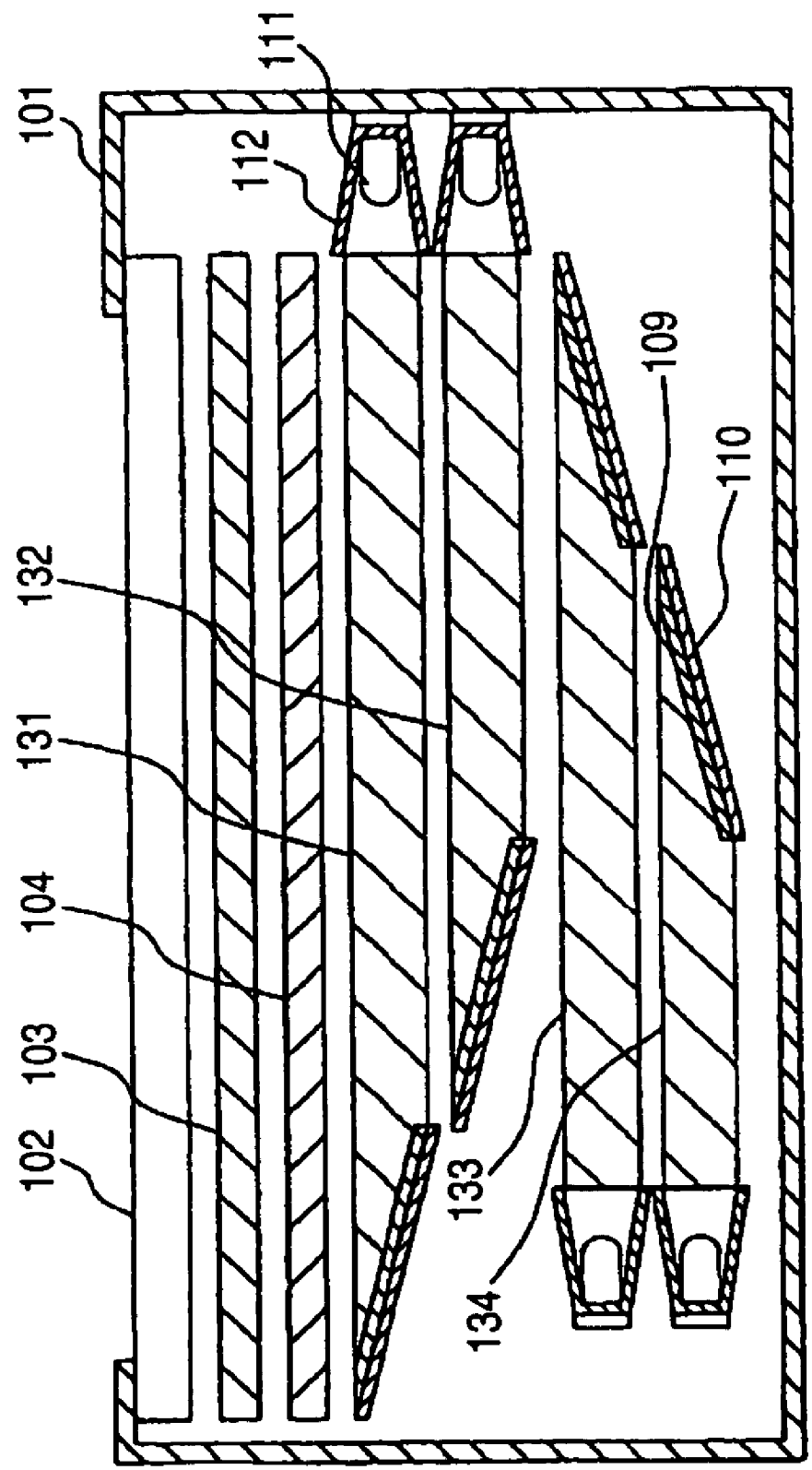
FIG. 29 is a sectional view showing the structure of an important part of yet another exemplary liquid crystal display device according to the fifth embodiment of the invention.

FIG. 29 is a sectional view showing the structure of an important part of yet another exemplary liquid crystal display device according to the fifth embodiment of the invention in which the end surface of each of light guide plates 131-134 that is located on the side opposite to the side where point light sources 111 are disposed is inclined toward the back side and a diffusion pattern 109 is formed on the slant surface. A reflection sheet 110 is disposed behind the region of each of the light guide plates 131-134 where the diffusion pattern 109 is formed, that is, behind the slant surface.

Of the light guide plates 131 and 132 that are disposed on the front side, the rear one is shorter than the front one in the side direction, that is, in the direction perpendicular to the arrangement direction of the point light sources 111. That is, the light guide plate 132 is shorter than the light guide plate 131 and the slant surface of the former is closer to the center than that of the latter is. Of the light guide plates 133 and 134 that are disposed on the back side, the rear one is shorter than the front one in the side direction. That is, the light guide plate 134 is shorter than the light guide plate 133 and the slant surface of the former is formed closer to the center than that of the latter is. The light guide plates 131-134 may be formed with slant surfaces by inclining their entire back surfaces toward the side opposite to the side where the point light sources 111 are disposed instead of inclining their end surfaces.

Spaces are formed behind the slant surfaces of the light guide plates 131 and 132 and the slant surfaces of the light guide plates 133 and 134. The point light sources 111 for the back-side light guide plates 133 and 134 can be disposed in one of those spaces. That is, the point light sources 111 can be disposed behind the slant surfaces of the light guide plates 133 and 134. This makes it possible to reduce the sideways expansion due to the placement of the point light sources 111 and hence is effective in narrowing the frame area of the liquid crystal display device. Further, since light beams traveling through the light guide plates 131-134 are reflected to the front side more efficiently by the slant surfaces, exit light beams can be output effectively from the regions where the diffusion patterns 109 are formed, that is, the regions to serve as light emission blocks.

Although the embodiment is directed to the case that light that is output from a back-side light guide plate is output from the device after penetrating through the light guide plate or plates that are located on the front side of the former, the invention is not limited to such a case. For example, front-side light guide plates may be shortened so as to decrease the number of light guide plates for light to penetrate through.

Figure 30:
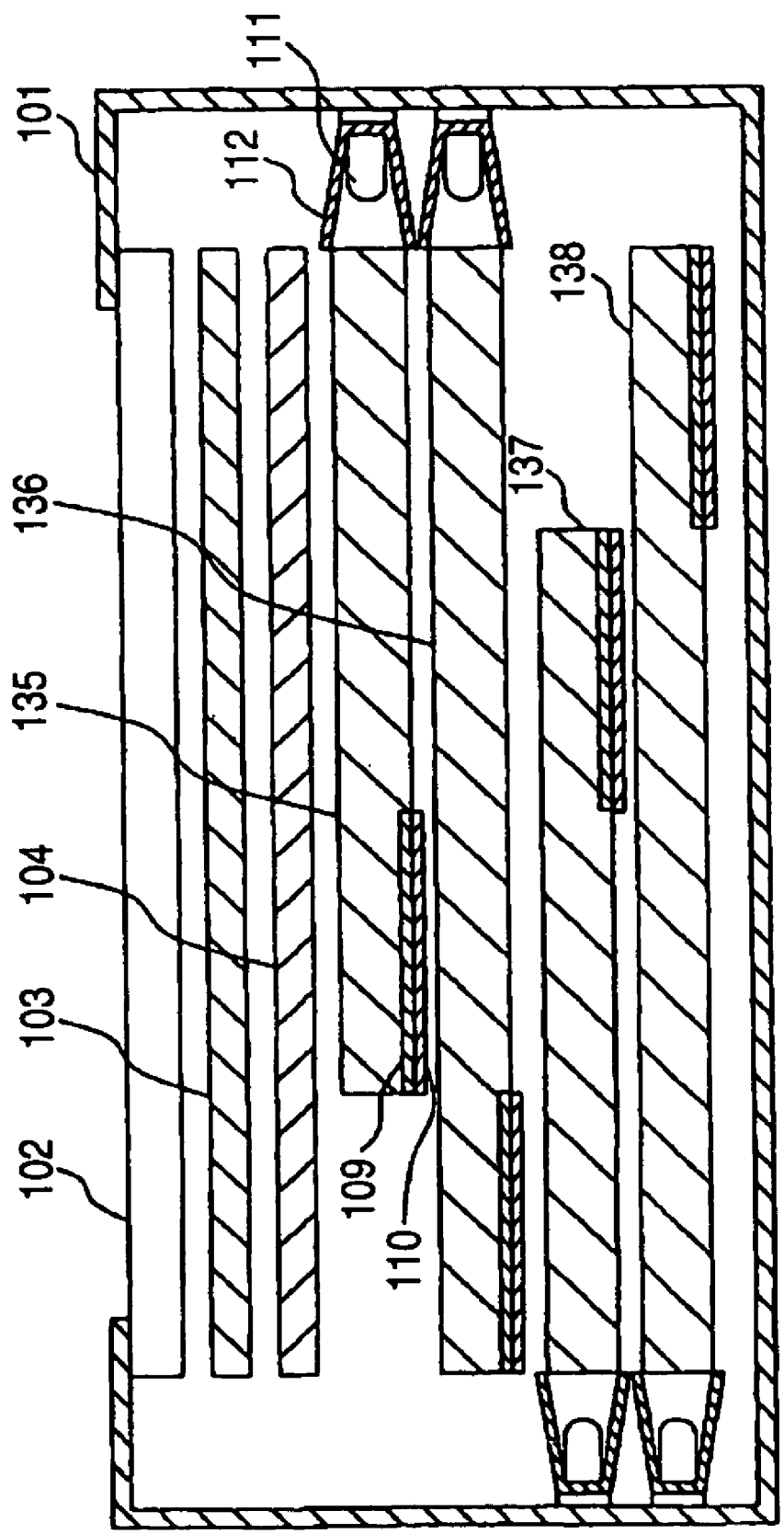
FIG. 30 is a sectional view showing the structure of an important part of a further exemplary liquid crystal display device according to the fifth embodiment of the invention.

FIG. 30 is a sectional view showing the structure of an important part of a further exemplary liquid crystal display device according to the fifth embodiment of the invention. Of light guide plates 135 and 136 that are disposed on the front side, the front one is shorter than the rear one in the side direction. That is, the light guide plate 135 is shorter than the light guide plate 136 and the light guide plate 135 is formed with a diffusion pattern 109 at a position closer to the center than the light guide plate 136 is. Of light guide plates 137 and 138 that are disposed on the back side, the front one is shorter than the rear one in the side direction. That is, the light guide plate 137 is shorter than the light guide plate 138 and the light guide plate 137 is formed with a diffusion pattern 109 at a position closer to the center than the light guide plate 138 is.

With the above structure, light that is output to the front side by means of the diffusion pattern 109 of the light guide plate 136 is output from the light exit area without penetrating through the light guide plate 135. Light that is output to the front side by means of the diffusion pattern 109 of the light guide plate 138 is output from the light exit area without penetrating through the light guide plate 137. Decreasing the number of light guide plates for light to penetrate through makes it possible to reduce the transmission loss of exit light and to thereby increase the efficiency of utilization of light. A high-luminance liquid crystal display device can thus be obtained.

Embodiment 6

The fifth embodiment is directed to the case that the light exit area is sectioned into plural light emission blocks by stacking plural light guide plates that are formed with diffusion patterns. In contrast, in this embodiment, the light exit area is sectioned into plural light emission blocks by plural light source units each of which is composed of a light guide plate for light emission, a light guide plate for light diffusion, and point light sources.

Figure 31:
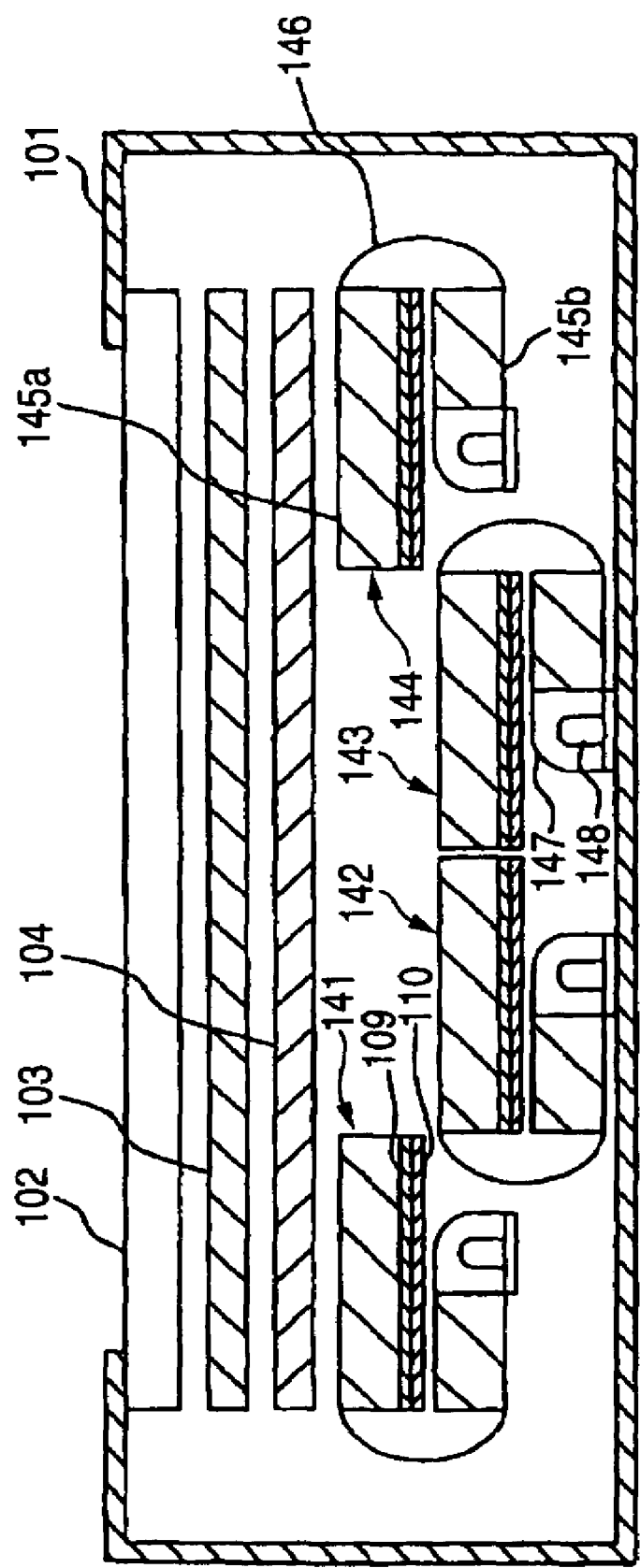
FIG. 31 is a sectional view showing the configuration of an exemplary liquid crystal display device according to a sixth embodiment of the invention.

FIG. 31 is a sectional view showing the configuration of an exemplary liquid crystal display device according to a sixth embodiment of the invention. In the liquid crystal display device according to this embodiment, the light exit area is sectioned by four light source units 141-144 that are provided for respective light emission blocks. Each of the light source units 141-144 is composed of a light guide plate 145a for light emission, a light guide plate 145b for light diffusion, and plural point light sources 148.

The entire back surface of the light guide plate 145a for light emission is formed with a diffusion pattern 109. A reflection sheet 110 is disposed behind the light guide plate 145a so as to be opposed to the diffusion pattern 109. The light guide plate 145b for light diffusion is shorter than the light guide plate 145a in the direction perpendicular to the arrangement direction of the point light sources 148, that is, in the direction parallel with the shorter sidelines of the light exit area. The point light sources 148 are directed to the front side, and a light source reflector 147 for reflecting light coming from the point light sources 148 to the light guide plate 145b is provided. The point light sources 148 are arranged along the one, inside end surface of the light guide plate 145b.

A side reflector 146 is provided for the light guide plates 145a and 145b, whereby the other end surface of the light guide plate 145b is optically coupled to the corresponding end surface of the light guide plate 145a. The side reflector 146 is a reflection member that is a silver-evaporated metal plate, for example. More specifically, the side reflector 146 is composed of a first reflection member that is disposed outside and a second reflection member that is disposed inside. The first reflection member connects the front surface of the light guide plate 145a and the back surface of the light guide 145b. The second reflection member connects the back surface of the light guide plate 145a and the front surface of the light guide 145b.

Light that is input from each point light source 148 to the associated light guide plate 145b through its one end surface travels through the light guide plate 145b and then is subjected to incident on the end surface of the light guide plate 145a via the side reflector 146. This input light travels through the light guide plate 145a, is diffuse-reflected by the diffusion pattern 109, and is output from the light exit area (front surface) of the light guide plate 145a. Since light that is input from each point light source 148 to the associated light guide plate 145b travels through the light guide plate 145b, it has been diffused sufficiently when it is output from the light guide plate 145b. This improves the color mixing performance and prevents luminance unevenness and color unevenness from occurring in the arrangement direction of the point light sources 148.

In this example, the light source units 142 and 143 that are closer to the center of the light exit area are located closer to the back side than the other light source units 141 and 144. That is, the side reflectors 146 of the light source units 142 and 143 are disposed behind the light guide plates 145a of the front light source units 141 and 144, respectively. This allows the light source units 141-144 to cover the entire light exit area without gaps.

Figure 32:
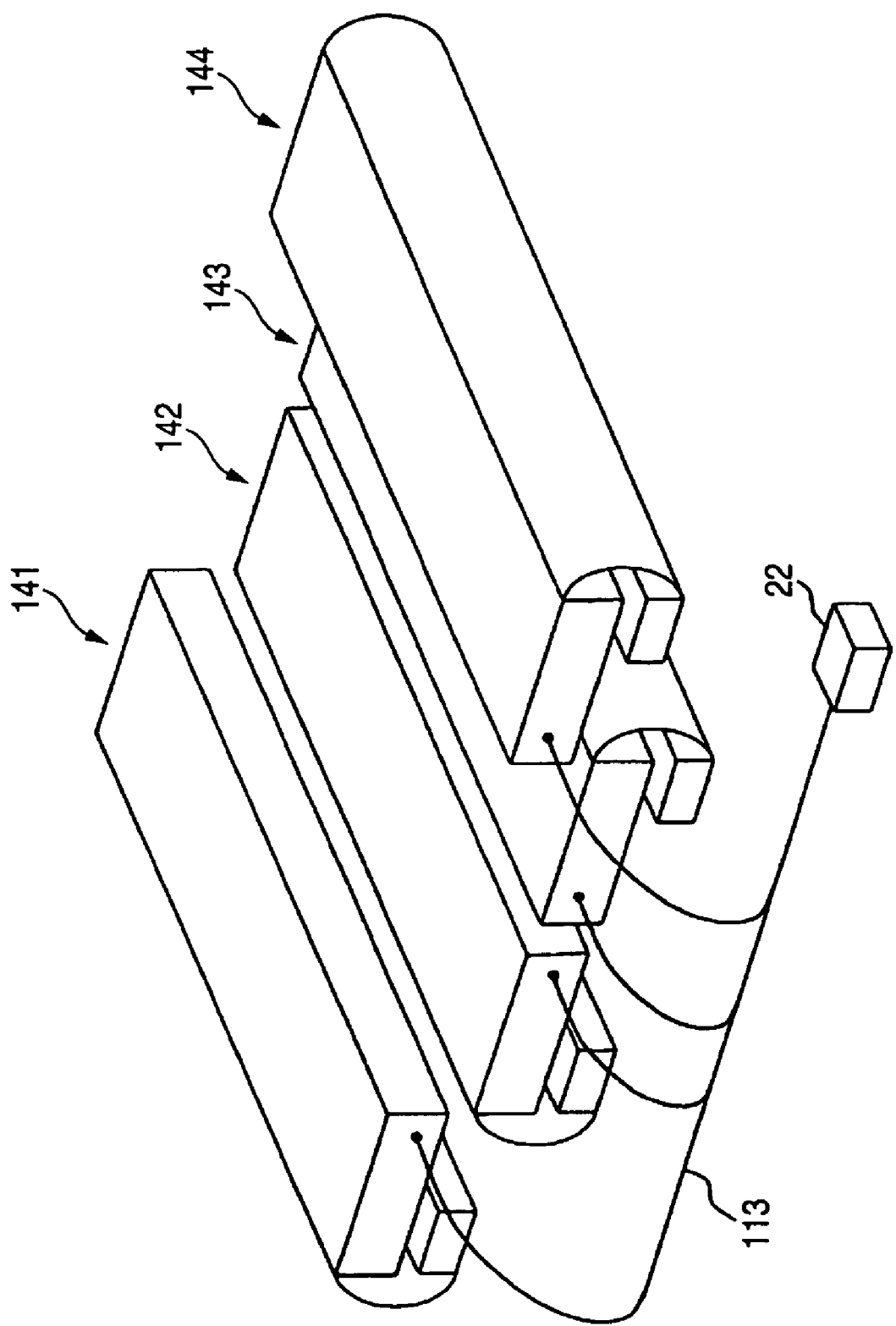
FIG. 32 is a perspective view showing an exemplary structure of an important part of the liquid crystal display device of FIG. 31.

FIG. 32 is a perspective view showing the structure of an important part of the liquid crystal display device of FIG. 31, and shows an optical fiber 113 and an optical sensor 22 that are disposed adjacent to the side surfaces of the light guide plates 145a of the light source units 141-144. The optical fiber 113 and the optical sensor 22 are disposed adjacent to the side surfaces of the light guide plates 145a that intersect the end surfaces on which light beams originating from the point light sources 148 are subjected to incidence.

The optical fiber 113 collects output light beams of the respective light emission blocks, that is, the respective light source units 141-144, and outputs resulting light to the optical sensor 22. Any of the light transmitting means shown in FIGS. 6-8 may be used instead of this optical fiber 113. This structure makes it possible to detect light quantities of the respective light emission blocks by the single optical sensor 22.

Figure 33:
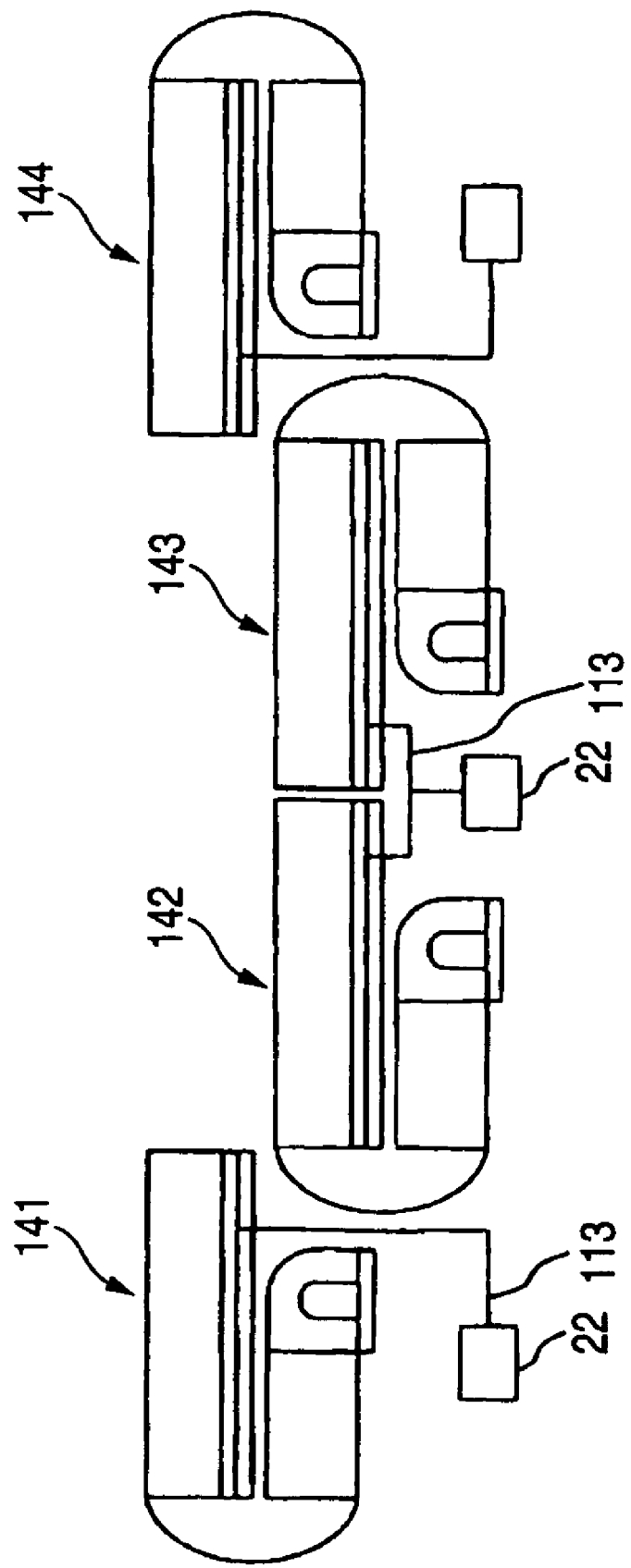
FIG. 33 is a side view showing another exemplary structure of an important part of the liquid crystal display device of FIG. 31.

FIG. 33 is a side view showing another exemplary structure of an important part of the liquid crystal display device of FIG. 31. In this exemplary structure, optical sensors 22 are disposed behind the light source unit 141, behind the light source units 142 and 143, and behind the light source unit 144. Each optical sensor 22 detects a light quantity of output light that is led out from the light guide plate 145a by the optical fiber 113 that is inserted in a through-hole formed through the reflection sheet 110. Since the light source units 142 and 143 are located closer the back side, spaces are formed behind the light source units 141 and 144. Disposing the optical sensors 22 in these spaces makes it possible to reduce the degree of widening of the frame area.

According to this embodiment, the color mixing performance can be improved without widening the frame area and the liquid crystal display device can be made thinner.

Although the embodiment is directed to the case that the light source units 142 and 143 that are closer to the center are located closer to the back side, the invention is not limited to such a case. For example, light source units may be arranged parallel with the light exit surface by inclining the back surfaces of light guide plates for light emission.

Figure 34:
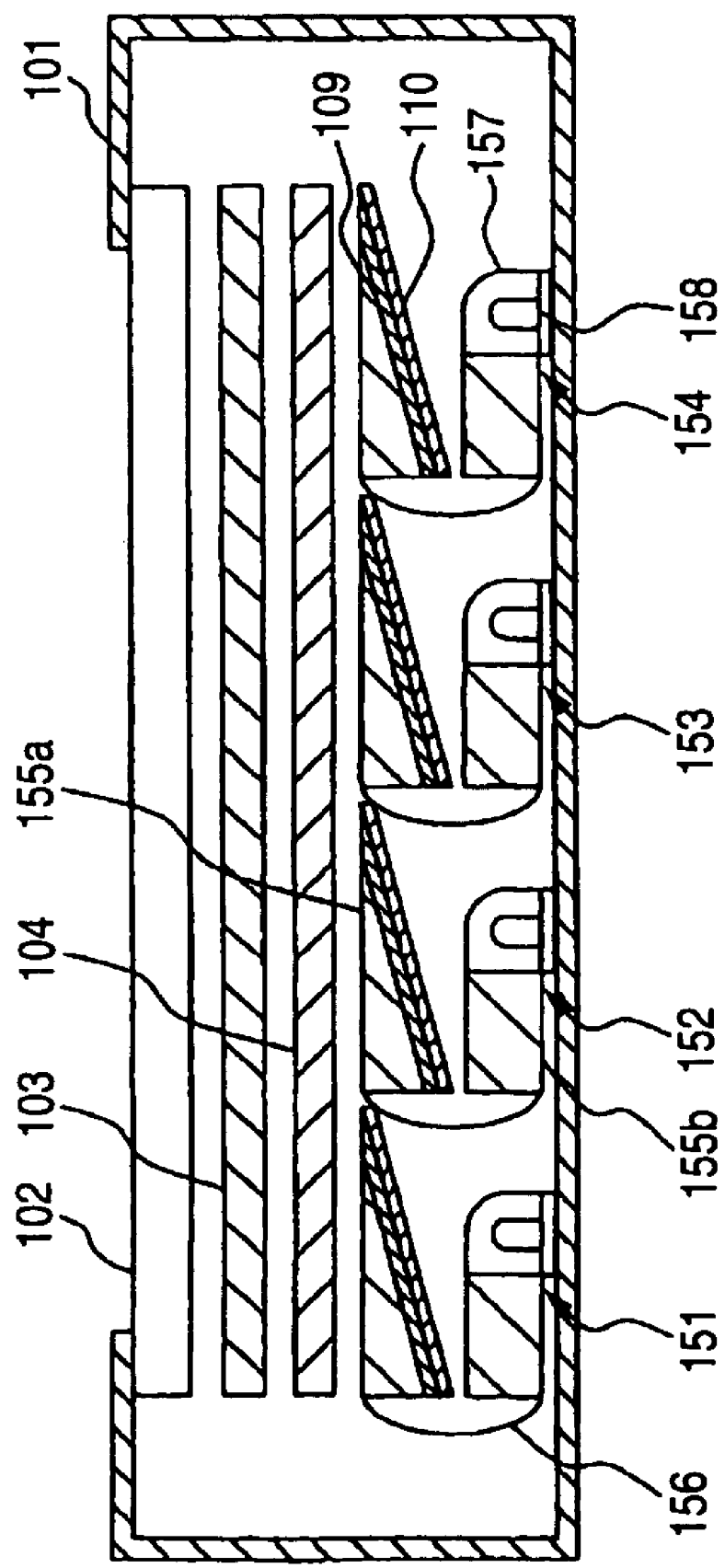
FIG. 34 is a sectional view showing the configuration of another exemplary liquid crystal display device according to the sixth embodiment of the invention.

FIG. 34 is a sectional view showing the configuration of another exemplary liquid crystal display device according to the sixth embodiment of the invention. In this exemplary configuration, the back surface of each light guide plate 155a for light emission is inclined toward the side opposite to the side where a side reflector 156 is disposed and a diffusion pattern 109 is formed on the entire slant surface. A reflection sheet 110 is disposed behind the slant surface of the light guide plate 155a so as to be opposed to the diffusion pattern 109.

In each of light source units 151-154, a light guide plate 155b and point light sources 158 are disposed behind the light guide plate 155a. The light guide plate 155b is coupled to the light guide plate 155a by a side reflector 156. Since the light source units 151-154 can be disposed parallel with the light exit surface without gaps, increase of the thickness of the liquid crystal display device can be prevented effectively even if the number of blocks of the light exit area is increased.

Embodiment 7

The fifth and sixth embodiments are directed to the case that light beams originating from the point light sources are output from the light exit area by using the light guide plates. In contrast, in this embodiment, light beams originating from point light sources are output from a light exit area by reflecting light beams traveling through hollow spaces by reflection members.

Figure 35:
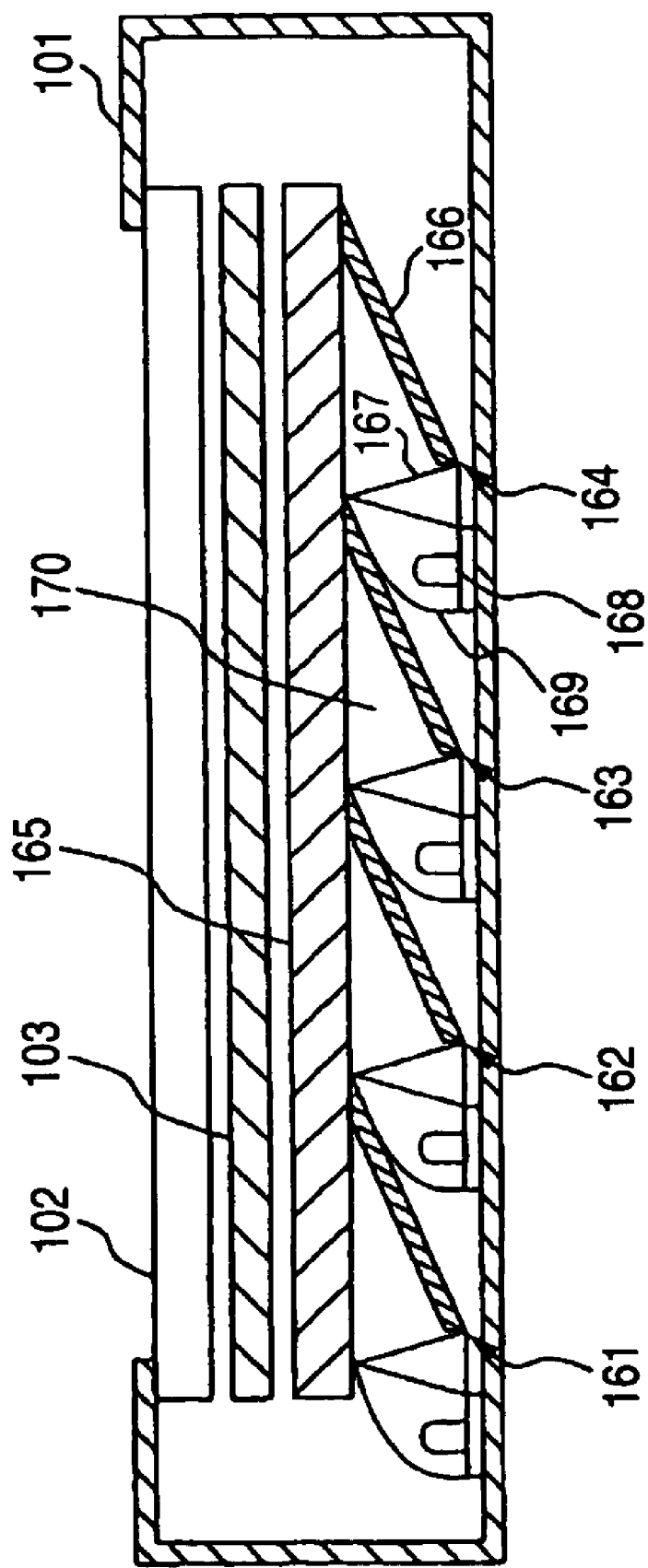
FIG. 35 is a sectional view showing the configuration of an exemplary liquid crystal display device according to a seventh embodiment of the invention.

FIG. 35 is a sectional view showing the configuration of an exemplary liquid crystal display device according to a seventh embodiment of the invention. In this exemplary configuration, a diffusion plate 165 is disposed behind an optical sheet 103 and light source units 161-164 are disposed behind the diffusion plate 165. Each of the light source units 161-164 is composed of a reflection plate 166, a deflection element 167, plural point light sources 168, and a reflector 169.

The diffusion plate 165 is formed by mixing a fine reflection material into a transparent, flat-plate-like member made of a synthetic resin or glass or roughening the surface of such a member. A hollow space 170 is formed between the diffusion plate 165 and reflection plate 166 of each of the light source units 161-164. The reflection plate 166 is a reflection member for reflecting light traveling through the hollow space 170 to the front side and is inclined toward the point light sources 168. That is, the reflection plate 166 is inclined so as to become closer to the diffusion plate 165 as the position goes away from the point light sources 168.

The deflection element 167 is an optical element for refracting light coming from each point light source 168 to the back side. In particular, the deflection element 167 refracts, to the back side, that is, to the reflection plate 166, part, having such an incident angle as to give a maximum luminance value, of light incident on its incident surface. Such a deflection element 167 is a transparent prism-shaped member made of glass or an organic resin such as an acrylic resin or a polycarbonate resin. The deflection element 167 is disposed along the hollow space, that is, parallel with the arrangement direction of the point light sources 168.

The luminance profile in the direction perpendicular to the arrangement direction of the point light sources 168 can be optimized by adjusting the shape of the deflection element 167 and the shape and the reflection characteristic of the reflection plate 166. For example, a luminance profile that the luminance is low in the vicinity of the point light sources 168 and increases as the position goes away from the point light sources 168 can be obtained.

Light radiated from each point light source 168 is subjected to incidence on the incident surface of the deflection element 167 directly or after being reflected by the reflector 169. The incident light is input to the hollow space after being refracted toward the reflection plate 166. The use of the deflection element 167 makes it possible to prevent light emitted from each point light source 168 from being output from a region close to the point light source 168 in the light exit area (front surface) of the diffusion plate 165 because the deflection element 167 refracts the light to the back side. This makes it possible to prevent luminance unevenness and color unevenness from occurring in the arrangement direction of the point light sources 168.

Since the reflection plates 166 are inclined, spaces are formed behind the respective reflection plates 166. The adjacent light source unit can be disposed behind the reflection plate 166 of each of the light source units 161-164. That is, the reflection plate 166 is disposed so as to cover the reflector 169 of the adjacent light source unit. Therefore, the light source units 161-164 can be disposed so as to cover the entire light exit area without gaps and the device can be made thinner.

Figure 36:
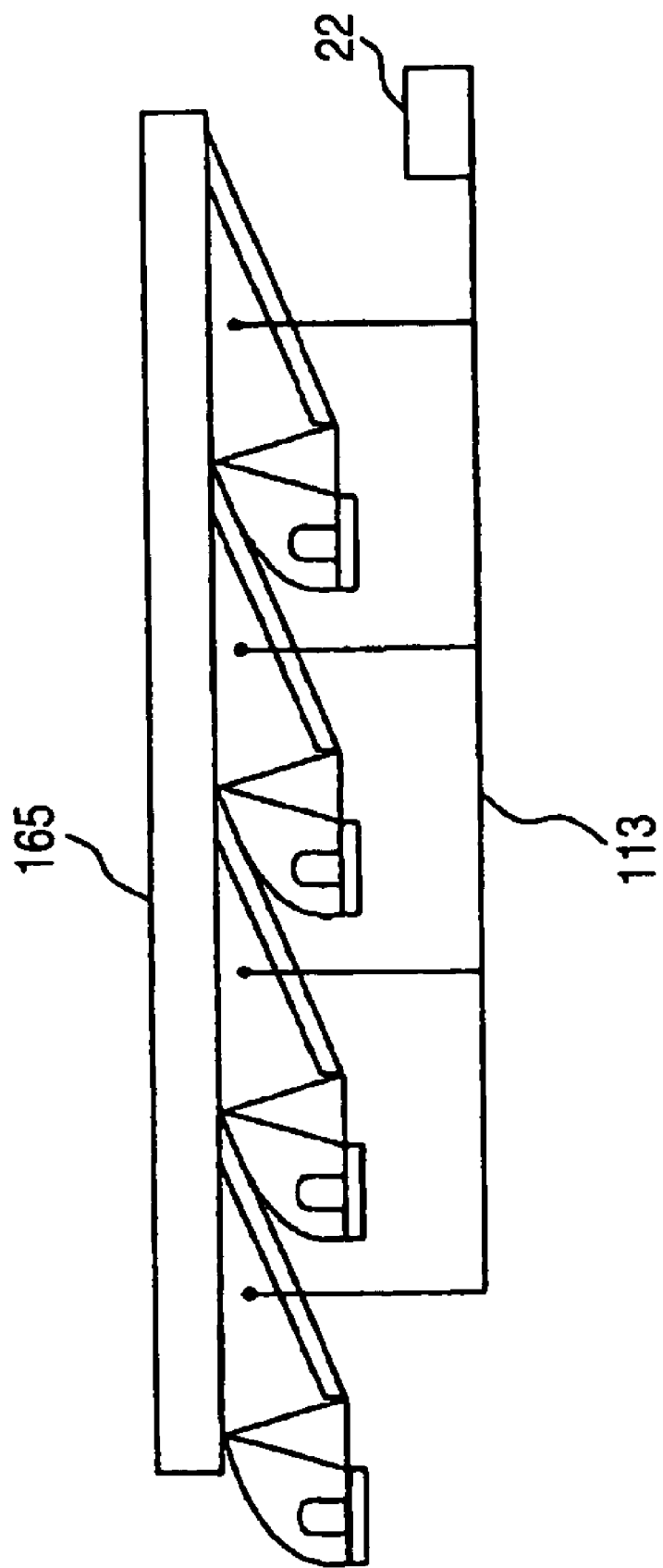
FIG. 36 is a side view showing an exemplary structure of an important part of the liquid crystal display device of FIG. 35.

FIG. 36 is a side view showing an exemplary structure of an important part of the liquid crystal display device of FIG. 35, and shows an optical fiber 113 and an optical sensor 22 that are disposed beside the hollow spaces 170 of the respective light source units 161-164. The optical fiber 113 collects output light beams of the respective light source units 161-164 and outputs resulting light to the optical sensor 22. Any of the light transmitting means shown in FIGS. 6-8 may be used instead of this optical fiber 113. This structure makes it possible to detect light quantities of the respective light emission blocks by the single optical sensor 22.

Figure 37:
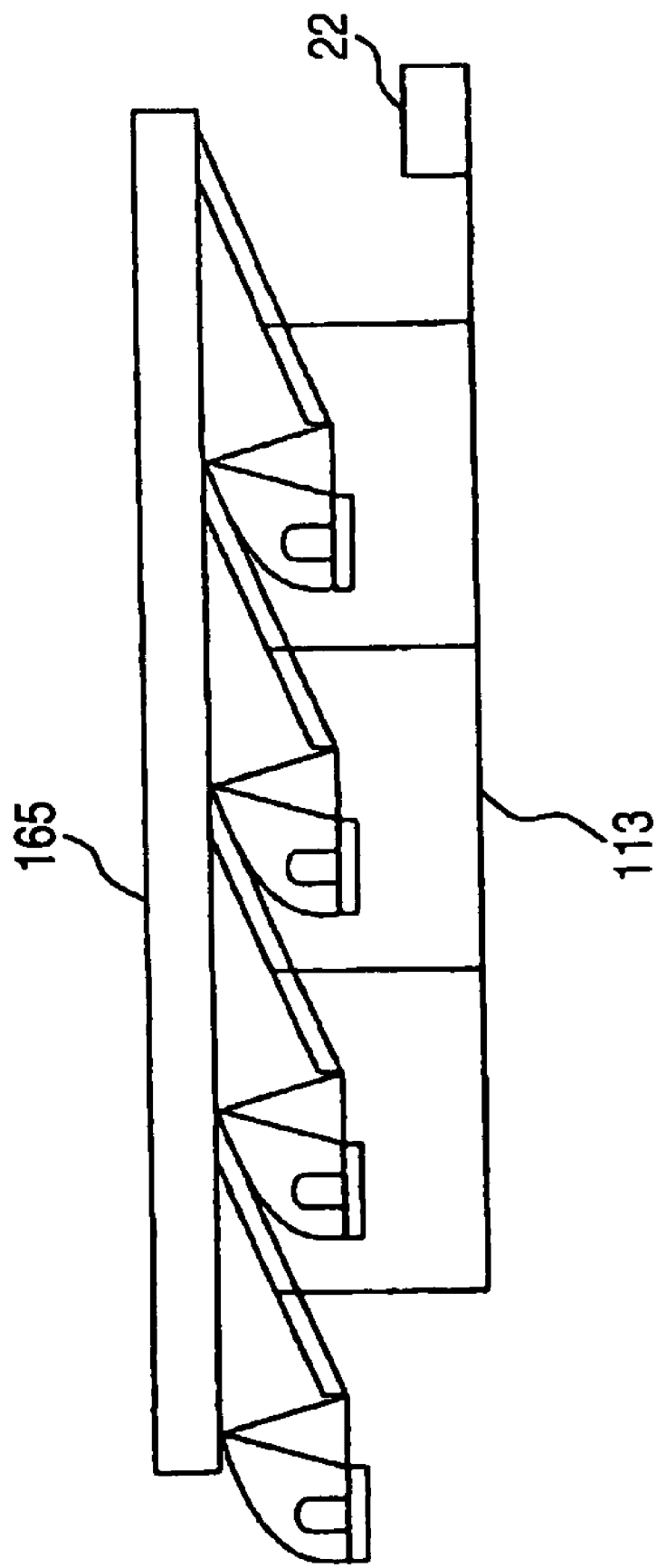
FIG. 37 is a side view showing another exemplary structure of an important part of the liquid crystal display device of FIG. 35.

FIG. 37 is a side view showing another exemplary structure of an important part of the liquid crystal display device of FIG. 35. In this exemplary structure, an optical fiber 113 is inserted in through-holes that are formed through the reflection plates 166 of the light source units 161-164. This structure also structure makes it possible to detect light quantities of the respective light emission blocks by the single optical sensor 22. The device can further be reduced in thickness by disposing the optical sensor 22 in the space that is formed behind one end reflection plate 166.

According to this embodiment, the use of the deflection elements 167 makes it possible to improve the color mixing performance without widening the frame area. Further, increase of the device thickness can be prevented even if the number of blocks of the light exit area is increased.

What is claimed is:

1. A surface light source device comprising:
    light source driving means for driving light sources on a light emission block basis, a light exit area being sectioned into two or more light emission blocks;
    light quantity detecting means for detecting light quantities on the basis of output light beams that are led out from the two or more light emission blocks;
    light transmitting means for transmitting output light beams of the respective light emission blocks to the light quantity detecting means; and
    drive control means for adjusting emission light quantities of the light sources corresponding to the respective light emission blocks on the basis of light quantities that are detected during lighting periods set in time-series order, each of the lighting periods in which the light source for only predetermined light emission blocks are lit up are subjected to light quantity detection by the light quantity detecting means,
    wherein the light quantity detecting means detects the light quantities of the output light beam in series corresponding to the lighting period, wherein the output light beams are led out from the respective light emission blocks and are transmitted by the light transmitting means.

2. The surface light source device according to claim 1, further comprising:
    two light guide plates that are sectioned by light reflecting means so as to correspond to the respective light emission blocks and are arranged in a front-rear direction,
    wherein two or more point light sources are arranged as part of the light sources along an end surface of one end of each of the light guide plates,
    light diffusing means is provided on a back surface of the light guide plate in a region closer to the other end, and the light diffusing means are formed on opposite sides on the front light guide plate and the rear light guide plate.

3. The surface light source device according to claim 2, wherein the light transmitting means is disposed adjacent to an end surface of an other end of the light guiding plates and is an optical fiber for collecting the output light beams of the respective light emission blocks.

4. The surface light source device according to claim 2, wherein the light transmitting means transmits light beams coming from the respective light guide plates to a single light quantity detecting means, and
    the drive control means turns on the individual point light sources in such a manner that lighting periods for the respective light guide plates are deviated from each other.

5. The surface light source device according to claim 2, further comprising:
    two or more engagement holes that are formed in the light guide plates so as to extend in their thickness direction and in which the respective point light sources are inserted.

6. The surface light source device according to claim 2 wherein each of confronting surfaces of the light guide plates is inclined toward the other end.

7. The surface light source device according to claim 2, wherein each of the point light sources on the side of the one end of each of the light guide plates includes two or more light-emitting elements having different emission colors that are arranged in a thickness direction of the light guide plate.

8. The surface light source device according to claim 1, wherein the drive control means lights the light sources with prescribed overlap periods.

9. The surface light source device according to claim 1, further comprising:
    light quantity detecting means in a number commensurate with the number of light emission blocks light sources for which are lit simultaneously.

10. A liquid crystal display device comprising:
    a liquid crystal panel having a TFT array substrate, for writing data to pixels on a gate line basis on the basis of an image signal; and
    the surface light source device according to claim 1, a for illuminating the liquid crystal panel from a back side in synchronism with a data write operation that is performed on a gate line basis, and sectioning a light exit area into two or more light emission blocks formed in a band-like manner so as to extend along the gate line.

11. A surface light source device comprising:
    light source driving means for driving light sources on a light emission block basis, a light exit area being sectioned into two or more light emission blocks;
    light quantity detecting means for detecting light quantities on the basis of output light beams that are led out from the two or more light emission blocks;
    drive control means for adjusting emission light quantities of the light sources corresponding to the respective light emission blocks on the basis of light quantities that are detected during lighting periods when only one of the light emission blocks is lit up that are subjected to light quantity detection by the light quantity detecting means;
    a light diffusion plate for diffusing light;
    hollow spaces that are formed behind the diffusion plate and sectioned for the respective light emission blocks by light reflecting means;
    a reflection member opposed to the diffusion plate with the hollow spaces interposed in between, for reflecting light traveling through the hollow spaces to a front side;

two or more point light sources that are arranged along the hollow spaces and serve as the light sources; and a deflection element for outputting light beams coming from the point light sources to the hollow spaces by refracting those toward the reflection member.

12. A surface light source device comprising:

light source driving means for driving light sources on a light emission block basis, a light exit area being sectioned into two or more light emission blocks;

light quantity detecting means for detecting light quantities on the basis of output light beams that are led out from the two or more light emission blocks;

drive control means for adjusting emission light quantities of the light sources corresponding to the respective light emission blocks on the basis of light quantities that are detected during lighting periods when only one of the light emission blocks is lit up that are subjected to light quantity detection by the light quantity detecting means;

a light guide plate for light emission that is sectioned for the respective light emission blocks by light reflecting means and is provided with light diffusing means on its back surface; and a light guide plate for light diffusion provided behind the light guide plate for light emission, wherein the light sources are two or more point light sources that are arranged along an end surface of one end of the light guide plate for light diffusion, and light that is output from an end surface of the other end of the light guide plate for light diffusion is subjected to incidence on an end surface of the light guide plate for light emission by a reflection member and is output from a light exit surface of the light guide plate for light emission.

13. The surface light source device according to claim 12, further comprising:

a reflection sheet disposed behind the light guide plate for light emission, for reflecting light coming from the light guide plate for light emission;

two or more through-holes formed through the reflection sheet for the respective light emission blocks along an arrangement direction of the point light sources; and light transmitting means inserted in the through holes, for transmitting output light beams of the respective light emission blocks to the light quantity detecting means.

14. A surface light source device comprising:

light source driving means for driving light sources on a light emission block basis, a light exit area being sectioned into two or more light emission blocks;

light quantity detecting means for detecting light quantities on the basis of output light beams that are led out from the two or more light emission blocks;

drive control means for adjusting emission light quantities of the light sources corresponding to the respective light emission blocks on the basis of light quantities that are detected during lighting periods when only one of the light emission blocks is lit up that are subjected to light quantity detection by the light quantity detecting means;

a light diffusion plate for diffusing light;

two or more light source units provided for the respective light emission blocks, wherein each of the light source units includes:

a hollow space formed behind the diffusion plate;

a reflection member opposed to the diffusion plate with the hollow space interposed in between, for reflecting light traveling through the hollow space to a front side;

two or more point light sources that are arranged along the hollow space and serve as part of the light sources; and a deflection element for outputting light beams coming from the point light sources to the hollow space by refracting it toward the reflection member.

15. The surface light source device according to claim 14, wherein the reflection member is a flat plate that is inclined toward the deflection element.

* * * * *